United States Patent [19]

Fujita et al.

[11] 4,278,258
[45] Jul. 14, 1981

[54] CONTAINER FOR HOLDING AT LEAST ONE RECORDING DISK AND DISK PLAYING SYSTEM

[75] Inventors: Makoto Fujita, Kadoma; Shoji Omiya, Shijonawate; Izumi Hino, Kyoto, all of Japan

[73] Assignee: Matsushita Electric Industrial Co., Ltd., Osaka, Japan

[21] Appl. No.: 76,128

[22] Filed: Sep. 17, 1979

[30] Foreign Application Priority Data

| | | | |
|---|---|---|---|
| Sep. 27, 1978 | [JP] | Japan | 53/119586 |
| Sep. 27, 1978 | [JP] | Japan | 53/119587 |
| Mar. 15, 1979 | [JP] | Japan | 54/30745 |
| Mar. 15, 1979 | [JP] | Japan | 54/30746 |
| Apr. 11, 1979 | [JP] | Japan | 54/44698 |
| Apr. 13, 1979 | [JP] | Japan | 54/45643 |
| May 8, 1979 | [JP] | Japan | 54/55986 |
| May 16, 1979 | [JP] | Japan | 54/60189 |
| May 16, 1979 | [JP] | Japan | 54/60190 |
| May 18, 1979 | [JP] | Japan | 54/61820 |

[51] Int. Cl.³ .................. B65D 85/57; G11B 17/04
[52] U.S. Cl. ............................ 369/36; 206/309; 369/77; 369/192; 369/291
[58] Field of Search ............ 206/309, 310, 311, 312, 206/444; 360/133, 86, 97, 98; 179/100.1 G; 274/1 R, 9 R, 9 B, 42 R, 12 R

[56] References Cited

U.S. PATENT DOCUMENTS

| | | | |
|---|---|---|---|
| 774,037 | 11/1904 | Burgi | 206/312 |
| 2,446,641 | 8/1948 | Daymon | 206/309 |
| 2,546,470 | 3/1951 | Mueller | 206/310 |
| 2,555,594 | 6/1951 | Markovitz | 206/309 |
| 2,881,004 | 4/1959 | Hahn | 274/1 R |
| 3,949,872 | 4/1976 | Paudras | 206/310 |
| 4,093,152 | 6/1978 | Peters | 274/9 R |

*Primary Examiner*—John W. Shepperd
*Attorney, Agent, or Firm*—Stevens, Davis, Miller & Mosher

[57] ABSTRACT

A container for holding at least one recording disk, including a container base formed with a circular opening and a disk holding space, and engaging and holding members movable between a first position for engaging and holding the disk and a second position for releasing the disk from the holding engagement, the engaging and holding members in the first position preventing the disks from coming out from the disk holding space. The disk held in the container can be placed on a turntable of a disk playing system without requiring user's manual attention. Such a disk playing system includes, besides the turntable, a loading base, release pins, a disk cam for actuating the release pins, and a vertically moving screw. When the disk container is placed on the loading base, the disk cam rotates to move the release pins so as to bring the release pins into engagement with the respective engaging and holding members, and to move the latter to the second position in which the disk is placed on the turntable. Meanwhile the loading base is moved by the vertically moving screw away from the disk and allows a pickup to have access to the recording surface of the disk.

16 Claims, 70 Drawing Figures

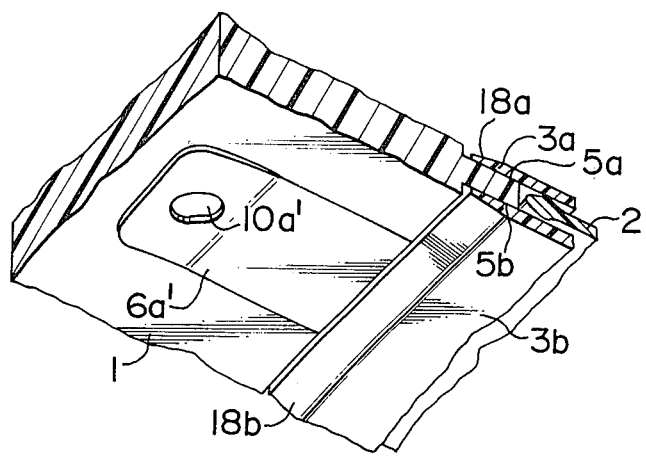
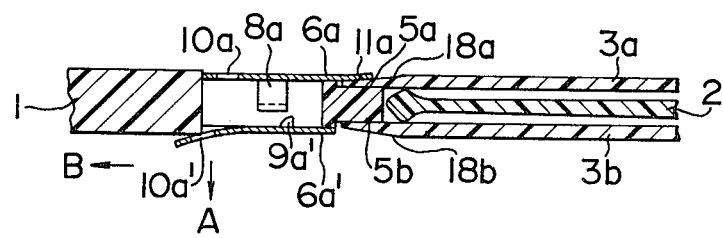
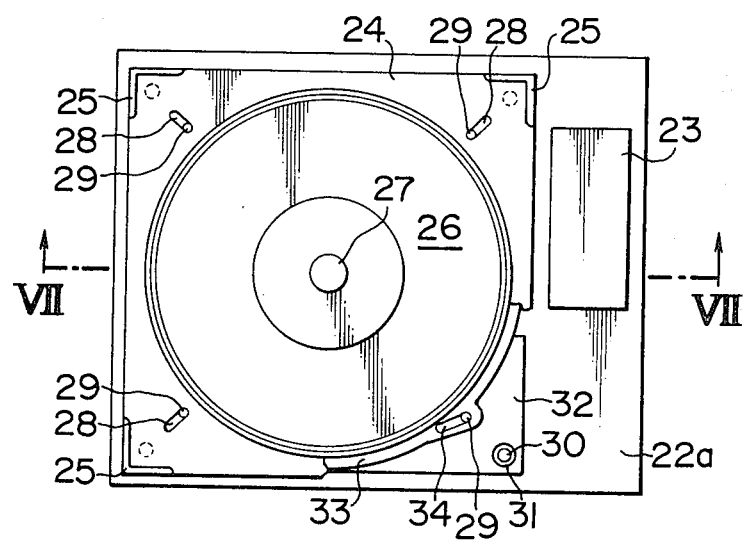

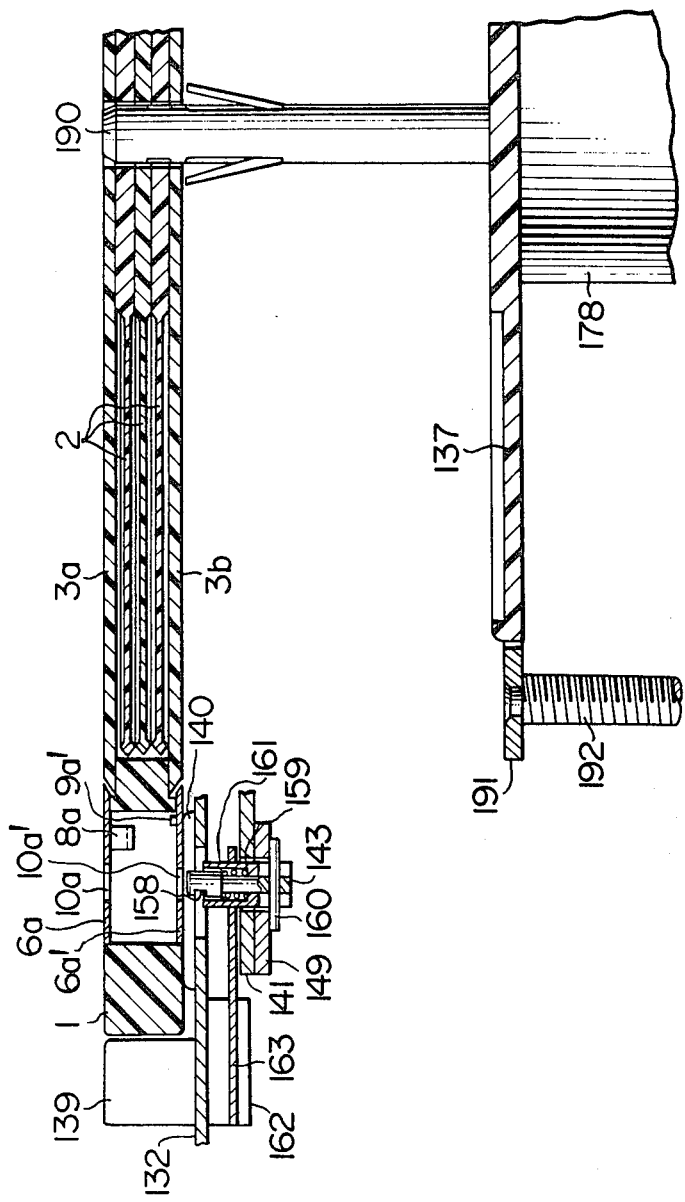

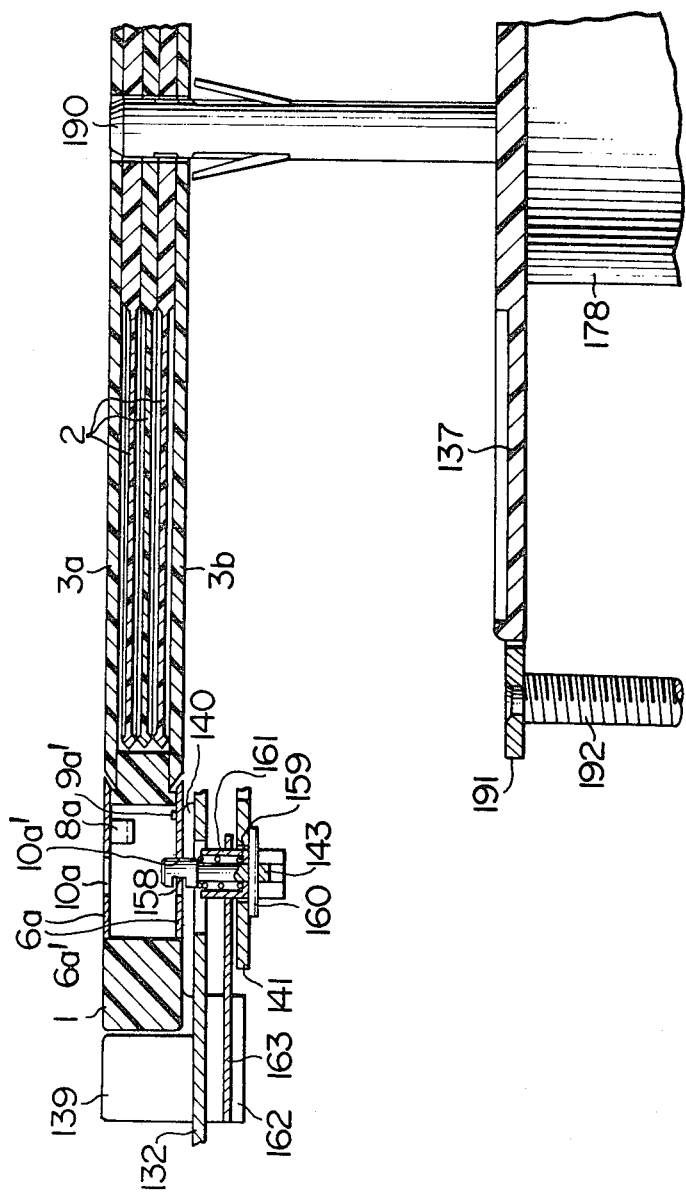

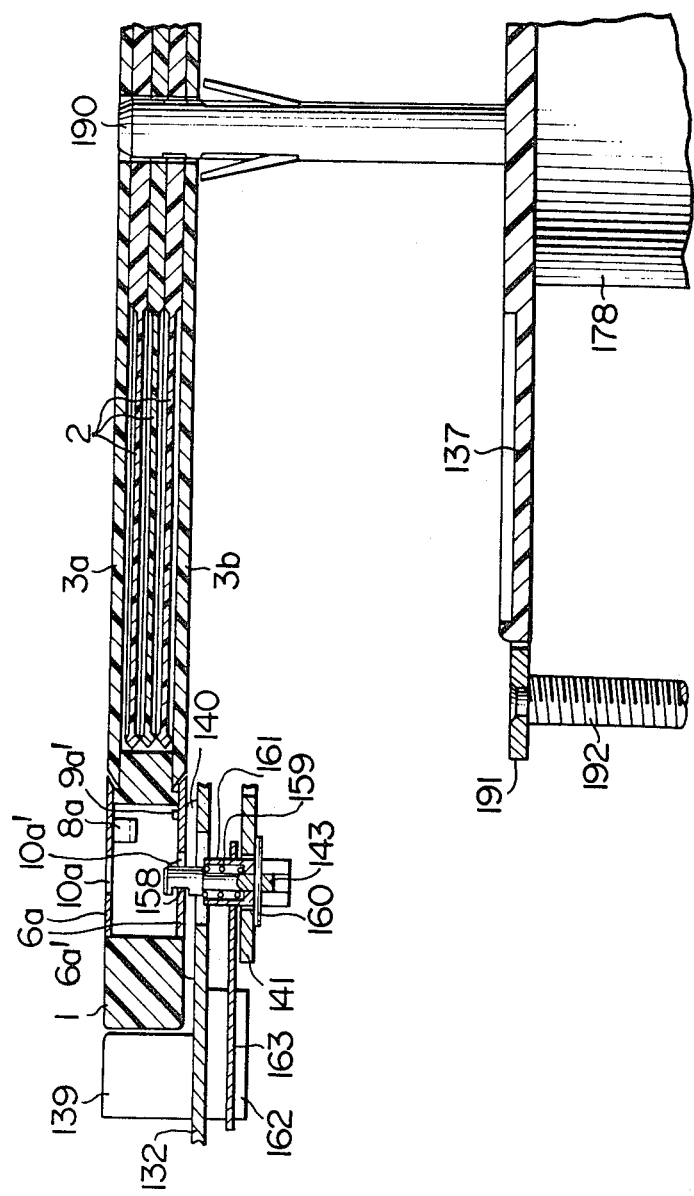

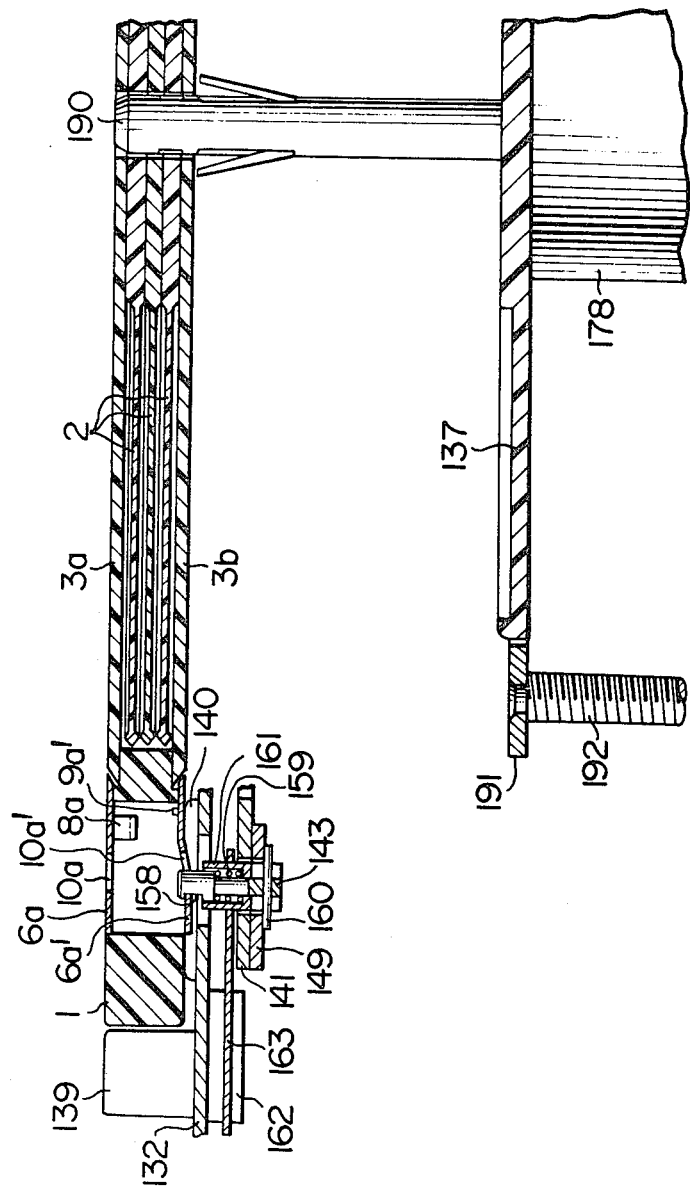

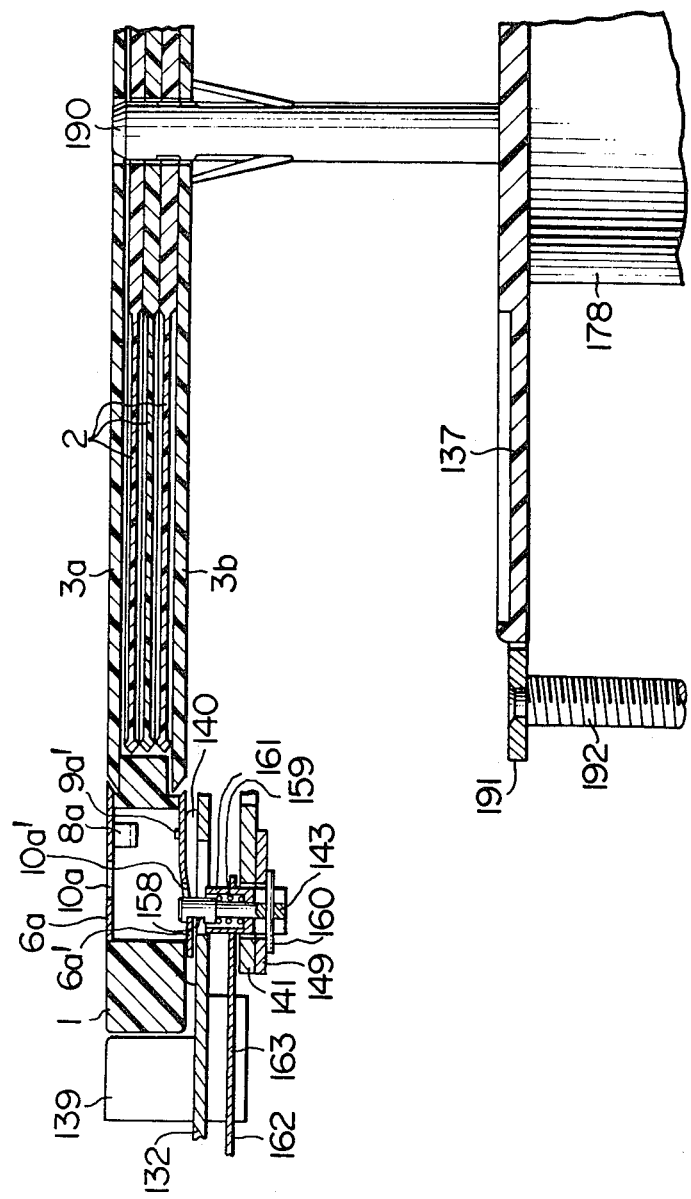

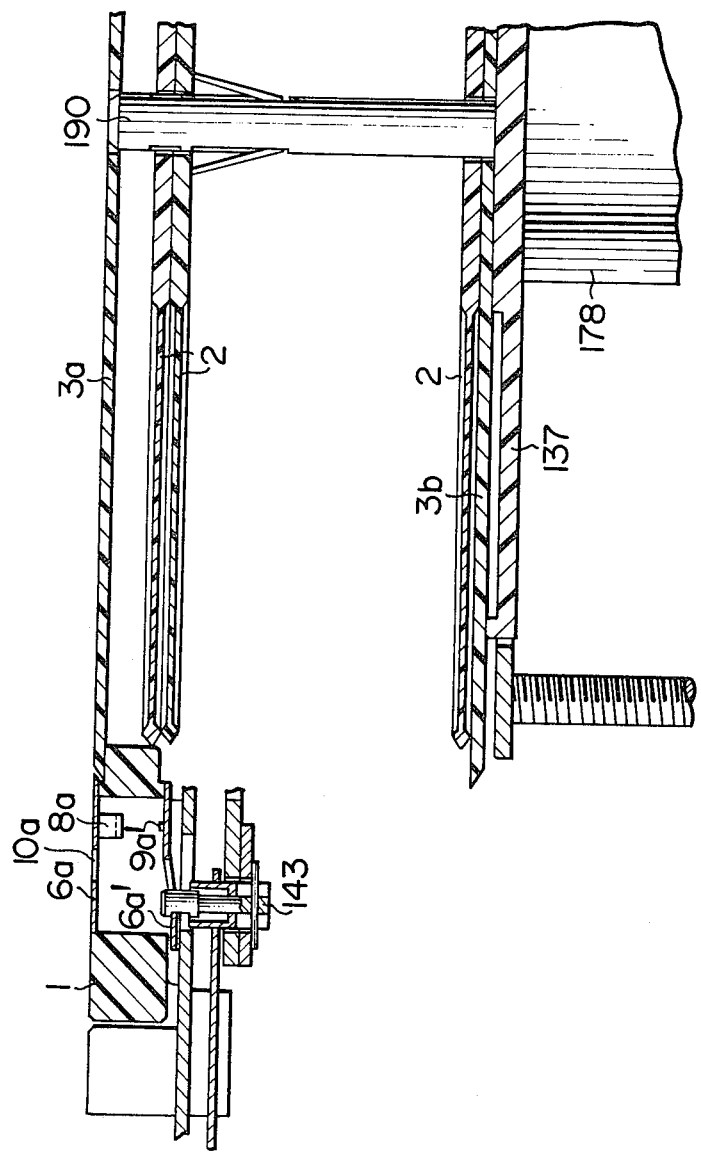

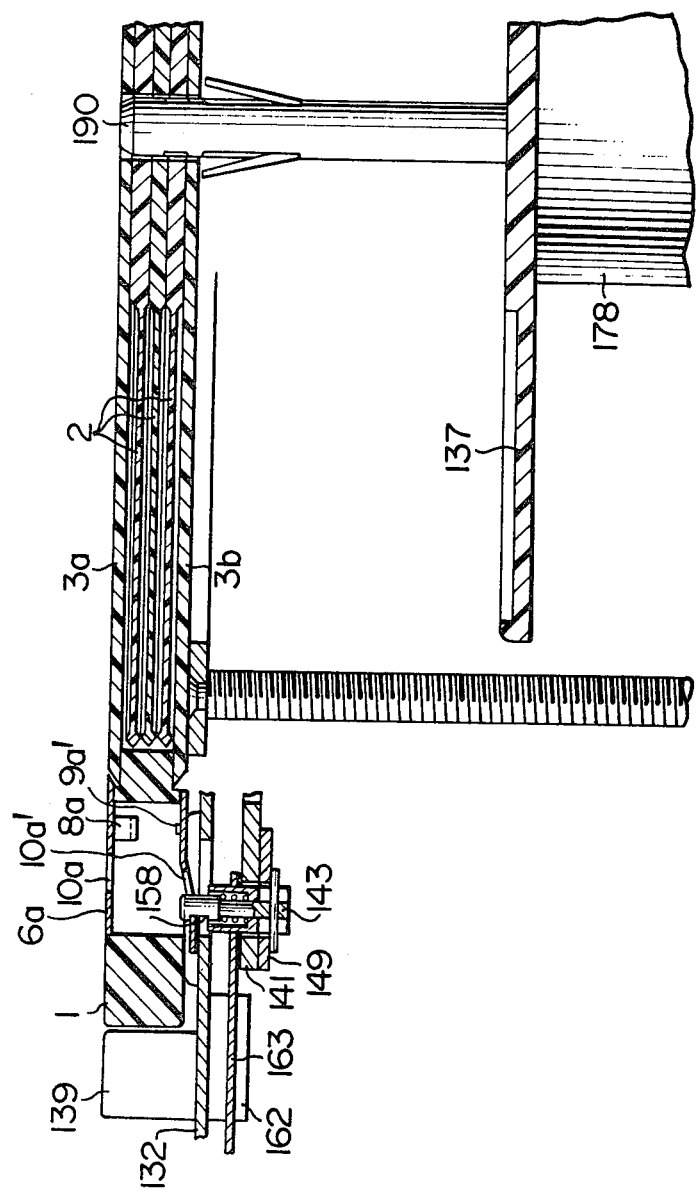

CONTAINER FOR HOLDING AT LEAST ONE RECORDING DISK AND DISK PLAYING SYSTEM

BACKGROUND OF THE INVENTION

This invention relates to a container for holding at least one recording disk (hereinafter referred to as a disk) having at least on one surface thereof a signal recording surface and a disk playing system for playing the disk held in such a container. The container according to the present invention is constructed such that the disk held in the container can be placed on the turntable of the disk playing system without being touched with the hand of the user.

Generally, a video disk accommodates high dense signals. For example, the grooves for recording the signals have a pitch of 4.5μ and their depth is very small. This makes it necessary to exercise caution in handling the video disk. Particularly, if dust, fingerprints, etc., adhere to the video disk or scratches are formed on the surface thereof, the phenomenon of dropout or locked grooves tends to occur, making it impossible to obtain a stable image on the screen. Thus there has hitherto been a demand for a container for a disk having high dense signals, which enables such disk to be placed on a turntable without being touched with the hand of the user so that the disk can be stored and played while the disk is being protected from the surrounding atmosphere. There has also been a demand for a playing system suitable for playing the disk held in such a container.

SUMMARY OF THE INVENTION

An object of this invention is to provide a container for holding therein at least one recording disk, simple in construction and low in cost, which makes it possible to hold the recording disk in such a condition that it is impervious to influences of atmosphere, and to place the recording disk on the turntable of a player, when desired, without being touched to the user.

Another object is to provide a recording disk player suitable for playing the disk held in the container of the type described.

According to the present invention, there is provided a container for a recording disk having at least on one surface thereof a signal recording surface, such a container comprising a container base formed of rigid material including a circular opening formed at least on one surface thereof and having a diameter greater than the diameter of the recording disk, and a disk holding space formed in the interior thereof and communicating with the circular opening, and a plurality of engaging and holding members movably arranged on the surfaces of the container base around the circular opening, said engaging and holding members being selectively movable between a first position in which their forward end portions project into the disk holding space in the vicinity of the circular opening and a second position in which their forward end portions are withdrawn from the disk holding space, so that the engaging and holding member in the first position prevents the recording disk from coming out from the disk holding space through the circular opening.

According to the present invention, there is also provided a recording disk playing system comprising a loading base arranged to be loaded with the container holding the recording disk described above thereon so that the position of the container on the loading base is regulated, means, arranged to engage the engaging and holding members of the container holding the recording disk when the container is placed on the loading base, for releasing the engaging and holding members so as to release the holding engagement of the recording disk, means for producing signals on the recording disk which is released from said container by the operation of the releasing means and placed on a turntable, and means for moving at least one of the record disk on the turntable and the container on the loading base relative to each other so as to return the recording disk on the turntable to the container.

BRIEF DESCRIPTION OF THE DRAWINGS

FIG. 4A being a perspective view and FIG. 4B being a sectional side view;

FIGS. 5A and 5B show the manner in which the engaging claw on the under-surface of the container is moved in sliding movement to place the recording disk on the turntable, FIG. 5A being a perspective view and FIG. 5B being a sectional side view;

FIG. 6 is a plan view of the player of one embodiment of the invention which uses the container for the recording disk shown in FIGS. 1 to 5B;

FIGS. 35A through 35G show the disk player loaded with the container for the disk players, FIG. 35A showing the disk player in the standby position as shown in FIGS. 34 and 26 and having the container placed therein, FIGS. 35B to 35E being similar to FIG. 35A but showing the interlocked events occurring in sequence as the disk cam rotates, FIG. 35F being similar to FIG. 35E but showing the disk player in condition for playing the disk and FIG. 35G being similar to FIG. 35F but showing the disk after completion of playing of all the disks in the container;

DESCRIPTION OF THE PREFERRED EMBODIMENTS

Figure 1:
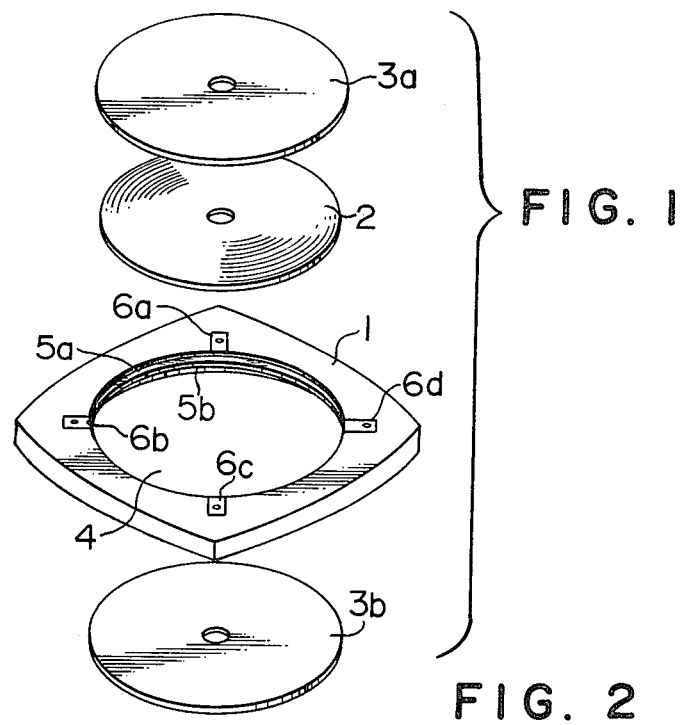
FIG. 1 is an exploded schematic view of one embodiment of this invention.

FIG. 1 shows the container for the disk in one embodiment of the invention. The numeral 1 designates a container base formed of rigid material, such as plastics, having four sides each in the form of a circular arc and a center opening 4. The numeral 2 designates a disk having on opposite sides thereof signal recording surfaces. The numerals 3a and 3b designate protective plates of disc shape having a diameter slightly larger than the diameter of the disk 2. The center opening 4 of the container base 1 has a slightly larger diameter than the disk 2 and a smaller diameter than the protective plates 3a and 3b and is arranged to hold the disk 2 therein. Annular offset portions 5a and 5b are formed in the upper and lower portions of the inner periphery of the container base 1 defining the center opening 4. The annular offset portions 5a and 5b are dimensioned such that they can snugly receive therein the protective plates 3a and 3b respectively.

A plurality of engaging claws 6a, 6b, 6c and 6d having some flexibility as subsequently described are slidably mounted on the container base each in one corner of the container base 1 so as to engage the protective plate 3a and to secure the same to the container base 1. Engaging claws 6a', 6b', 6c' and 6d' are also mounted on the undersurface of the container base 1 in positions corresponding to those of the engaging claws 6a–6d to secure the protective plate 3b to the container base 1.

Figure 2:
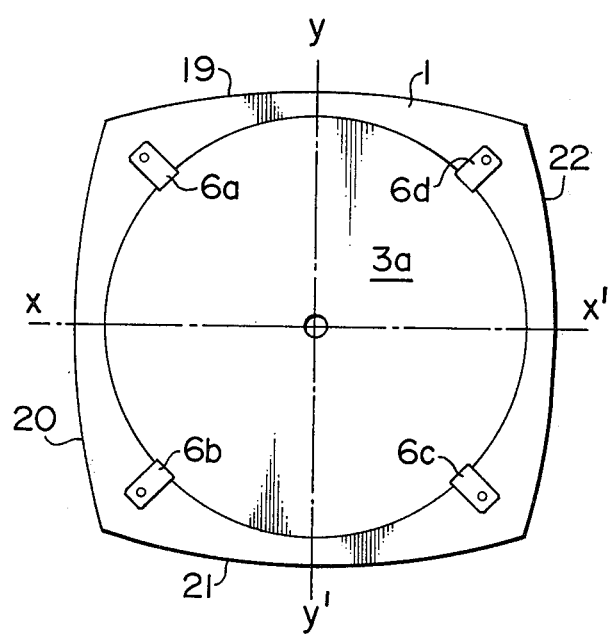
FIG. 2 is a plan view of the embodiment shown in FIG. 1.

FIG. 2 is a plan view of the container which holds the disk 2 and others disks, wherein two sides 19 and 21 of the container base 1 are each in the form of an arc of an imaginary circle centered on a center line y—y' of the container (a line passing through the center of the center opening 4) and having a diameter 1.5 to 2.5 times as great as the diameter of the protective plate 3a, and two sides 20 and 22 thereof are each in the form of an arc of an imaginary circle centered on the center line x—x' perpendicular to the center line y—y'. The four sides 19, 20, 21 and 22 are connected together to form the outer periphery of the container base 1.

Figure 3:
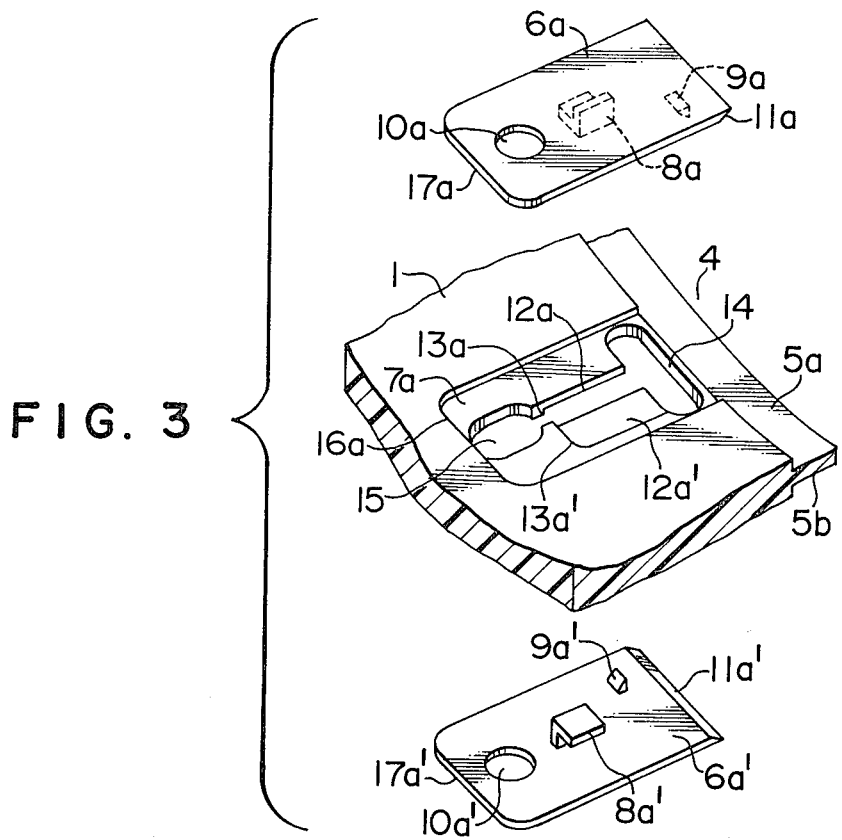
FIG. 3 is a perspective view of the engaging claws provided on the surface and undersurface of one corner of the container shown in FIG. 1.

FIG. 3 shows in an enlarged scale the engaging claws 6a and 6a' located at one corner of the container base 1 in the uppersurface and undersurface thereof respectively. Located in the center of the engaging claws 6a and 6a' are L-shaped guides 8a and 8a' respectively. At the forward and rearward end portions of the engaging claws 6a and 6a' are located locking projections 9a and 9a' and release openings 10a and 10a', respectively. Tapering surfaces 11a and 11a' are formed at the forward edges of the engaging claws 6a and 6a'. Meanwhile guide recesses 7a and 7a' (7a' not shown in FIG. 3) are formed in the uppersurface and undersurface of the container base 1 for receiving the engaging claws 6a and 6a' therein respectively. The recesses 7a and 7a' open at one end thereof to the annular offset portions 5a and 5b respectively. The guide recesses 7a and 7a' are each formed therein with an opening 15 and recessed sliding surfaces 12a and 12a' for engaging the guides 8a and 8a', respectively. The guides 8a and 8a' is arranged to abut against end edges 13a and 13a' of the recessed sliding surfaces 12a and 12a', respectively, for restricting the sliding movement of the guides 8a and 8a' (of the engaging claws 6a and 6a'). The opening 15 has one end 14 against which the locking projections 9a and 9a' abut to regulate the sliding movement of the engaging claws 6a and 6a'.

Figure 4A:
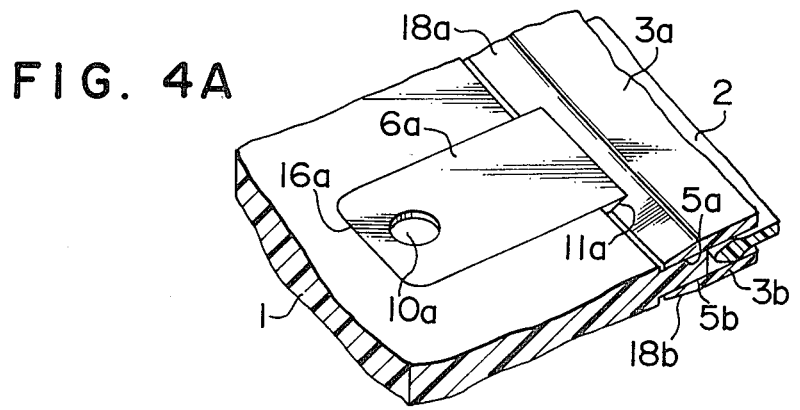
FIGS. 4A and 4B show the engaging claws shown in FIG. 3 being fitted in the guide recesses.
Figure 4B:
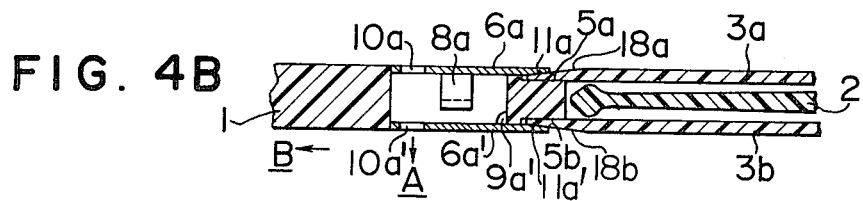

FIGS. 4A and 4B show the engaging claws 6a and 6a' fitted in the guide recesses 7a and 7a', respectively. The disk 2 is held in the center opening 4 of the container base 1 and has the protective plates 3a and 3b disposed above and below the disk 2. The outer marginal portions of the protective plates 3a and 3b are disposed on the offset portions 5a and 5b, respectively and have tapering surfaces 18a and 18b which are pressed toward the annular offset portions 5a, 5b by the engaging claws 6a and 6a', respectively, so that the protective plates 3a and 3b are secured to the container base 1. The engaging claws 6a and 6a' in this condition will be described by referring to FIG. 3. The guides 8a and 8a' of the engaging claws 6a and 6a' slidably engage the sliding surfaces 12a and 12a', respectively, to prevent the engaging claws 6a and 6a' from being dislodged in the thickness-wise direction. End edges 17a and 17a' of the engaging claws 6a and 6a' are brought into abutting engagement with terminal end edges 16a and 16a' of the guide recesses 7a and 7a', respectively, and the locking projections 9a and 9a' provided on the engaging claws 6a and 6a' are brought into abutting engagement with the end 14 of the opening 15, thereby limiting sliding movement of the engaging claws 6a and 6a'. At this time, the surface of the engaging claw 6a (6a') is substantially flush with the surface of the container base 1.

By the arrangement described hereinabove, the disk 2 is held securely in the container base 1 while being held between the protective plates 3a and 3b disposed above and below the disk 2.

FIGS. 5A and 5B show the manner in which the engaging claw 6a' has been moved in sliding movement before bringing the disk 2 on the turntable. The engaging claw 6a' shown in FIGS. 4A and 4B shifts to a condition shown in FIGS. 5A and 5B if a release pin, now shown, is inserted in a release opening 10a' to bend the end portion of the engaging claw 6a' in the direction of an arrow A (See FIG. 4B) to release the end edge 17a' of the engaging claw 6a' from abutting engagement with the terminal end edge 16' of the guide recess 7a', and then the engaging claw 6a' is moved in the direction of an arrow B. This releases the engaging claw 6a' from engagement with the protective plate 3b and allows the disk 2 to be removed from the container base 1 together with the protective plate 3b.

The sliding movement of the engaging claw 6a' in the direction of the arrow B is restricted by the guide 8a' abutting against the end edge 13a' of the sliding surface 12a'.

The aforesaid description refers to the engaging claws 6a and 6a'. It is to be understood that other engaging claws 6b, 6c and 6d and 6b', 6c' and 6d'' are constructed and function in the same manner as described by referring to the engaging claws 6a and 6a', therefore the description concerning the engaging claws 6b–6d and 6b'–6d'' is omitted.

One example of the disk players arranged to use the container for the recording disk constructed as described hereinabove by referring to FIGS. 1 to 5 is shown in FIGS. 6 to 10C. FIG. 6 is a plan view, and FIGS. 7A and 7B are a sectional views taken along the line VII—VII in FIG. 6. FIG. 7A shows the disk player in non-playing mode and FIG. 7B shows the disk player in playing mode. The numeral 22a designates a casing of the disk player having a base plate 32 secured thereto for supporting a turntable 26 having a center shaft 27 rotated by a motor 35. The base plate 32 has attached thereto four nuts 31 rotated by a dirve means, not shown, when necessary. Each of the nuts 31 has a threaded rod 30 in threadable engagement therewith, so that rotation of the nuts 31 by the drive means moves the threaded rods 30, vertically. The threaded rods 30 has secured at their upper ends to a platform 24 for placing the disk container thereon. The platform 24 is formed with an opening for the turntable 26, and has positioning members 25 in four corners thereof for regulating the position where the disk container is placed. As shown in FIGS. 8A and 8B, the platform 24 has release pins 29 each supported for pivotal movement about a pin 37. The forward end of each release pin 29 projects upwardly from a guide groove 28 formed in the platform 24 and the rear end thereof is inserted in a cam slat 34 of a cam ring 33. The cam ring 33 is driven by a drive means, not shown, for rotation in the normal and reverse directions and supported by the platform 24 by support members, not shown. Movement of the cam ring 33 in the direction of an arrow P (FIG. 9A) moves each release pin 29 from the position shown in FIG. 8B to the position shown in FIG. 9B.

Figure 7A:
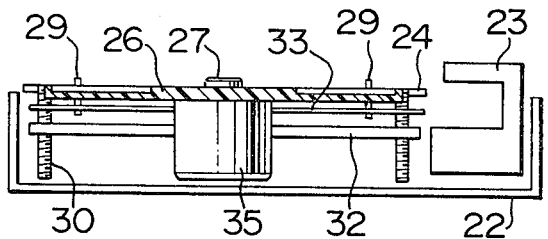
FIGS. 7A and 7B are a sectional view taken along the line VII—VII in FIG. 6, FIG. 7A showing the player in non-playing mode and FIG. 7B showing the player in playing mode.
Figure 7B:
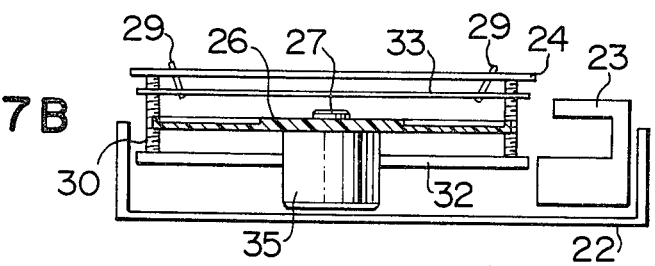
Figure 8A:
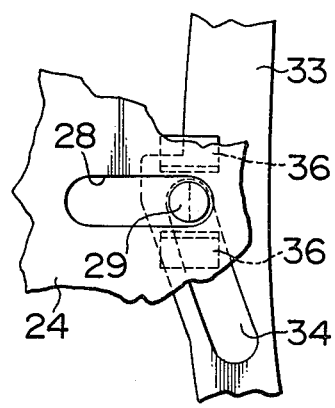
FIGS. 8A and 8B show the release pin and parts associated therewith of the player shown in FIG. 6 in non-playing mode, FIG. 8A being a plan view and FIG. 8B being a side view.
Figure 9A:
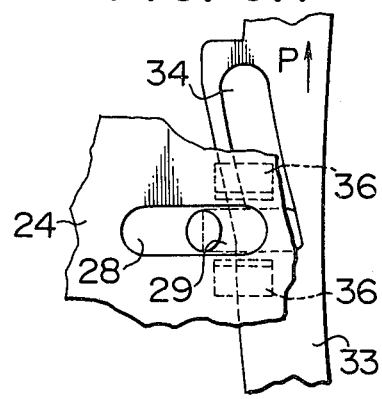
FIGS. 9A and 9B show the release pin and parts associated therewith of the player shown in FIG. 6 in playing mode, FIG. 9A being a plan view and FIG. 9B being a side view.
Figure 8B:
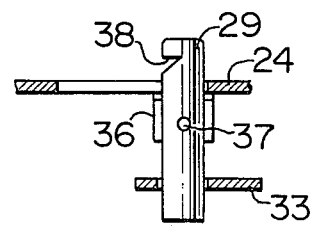
Figure 9B:
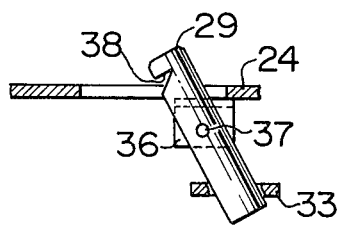
Figure 10A:
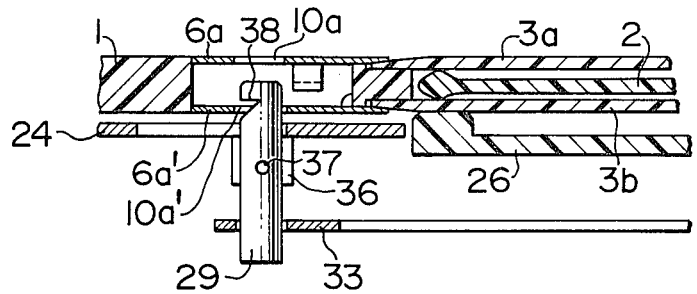
FIGS. 10A, 10B and 10C show the container for the recording disk being placed on the turntable of the player, FIG. 10A being a fragmentary sectional side view showing one of the protective plates in abutting engagement with the turntable, FIG. 10B being a fragmentary sectional side view showing the release pin being moved in pivotal movement from the position shown in FIG. 10A and FIG. 10C being a fragmentary sectional side view showing one of the protective plates and the disk being placed on the turntable.
Figure 10B:
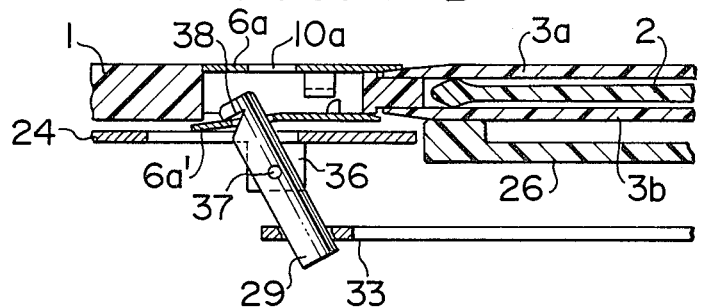
Figure 10C:
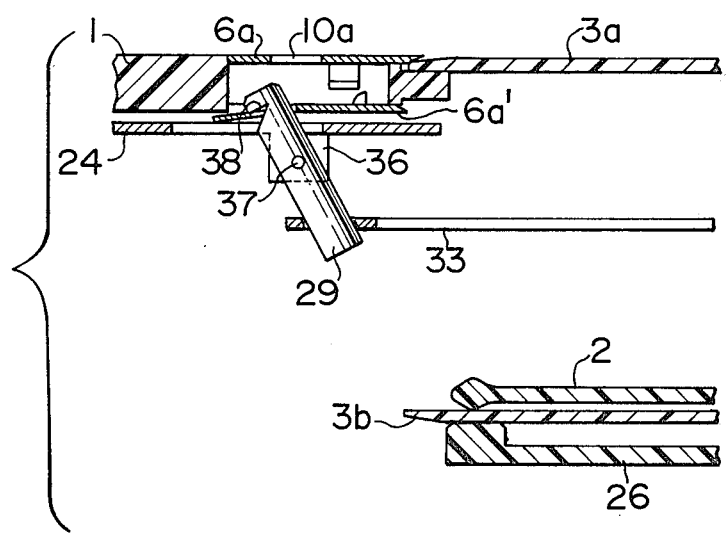

When the disk container is placed on the platform 24 of the disk player in the condition shown in FIG. 7A, the protective plate 3b is brought into abutting engagement with the turntable 26 as shown in FIG. 10A, and each of the release pins 29 is inserted in one of the release openings 10a' to 10d' of the engaging claws 6a' to 6d'. Movement of the cam ring 33 in the direction of the arrow P in this condition pivotally moves each release pin 29 to an inclined position shown in FIG. 10B, and an engaging cutout 38 formed in each release pin 29 is brought into engagement with one of the engaging claws 6a' to 6d', thereby moving the engaging claws 6a' to 6d' in a direction in which the engaging claws 6a' to 6d' are released from engagement with the protective plate 3b. The nuts 31 are rotated when the player is in the condition shown in FIG. 10B to move the platform 24 upwardly, leaving the protective plate 3b and the disk 2 placed on the turntable 26 and the protective plate 3a moved upwardly together with the disk container as shown in FIG. 10C. Pickup means 23 of known construction is moved when the disk player is in this condition, so as to play the disk 2 on the turntable 26. Upon completion of playing of the disk 2, the operations described hereinabove are performed in reverse order. That is, the cam ring 33 is rotated in the reverse direction after the platform 24 is moved downwardly.

Figures 11, 12:
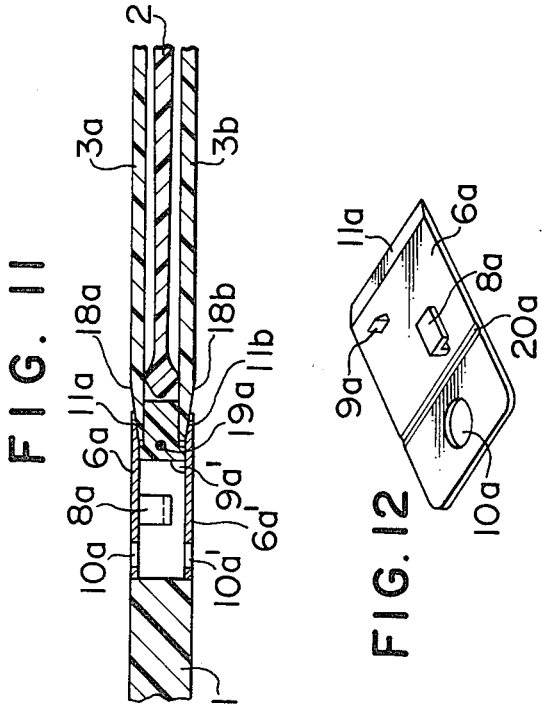
FIG. 11 is a sectional side view similar to FIG. 4B but showing a copper wire embedded in the container base to increase its mechanical strength.
FIG. 12 is a schematic view of a modification of the engaging claws shown in FIG. 3 in which a slit is formed therein.

When the container base 1 is formed as of plastics, a steel wire 19a may be embedded as shown in FIG. 11 to increase mechanical strength of the container base 1. This prevents deformation not only of the container base 1 but also of the disk 2.

Figure 13:
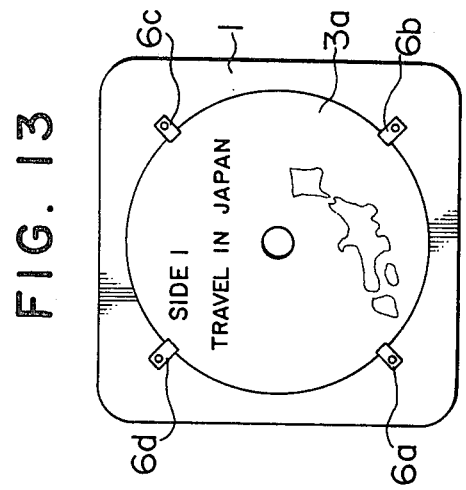
FIG. 13 is a plan view of the container for the recording disk having an indication of the contents of the disk on the protective plates.

By forming a groove 20a in the engaging claw 6a as shown in FIG. 12, deformation of the engaging claw 6a during its sliding movement can be facilitated. Moverover, by using the protective plates 3a and 3b made of transparent material, it is possible to ascertain from outside that the disk 2 is held between the protective plates 3a and 3b in the container base 1. Alternatively, an indication of the content of the disk 2 may be given on the protective plates 3a and 3b as shown in FIG. 13.

From the foregoing description, it will be appreciated that the present invention can prevent foreign objects from adhering to the disk 2 when it is not in use and makes it possible to load a disk player with the disk 2 which is held in the disk container without the user being touched with the hand to manually remove the disk 2 from the disk container for loading the player with the disk 2. Also, the arrangement whereby the disk 2 is held in the disk container while being held between the protective plates 3a and 3b enables deformation of the disk 2 to be avoided if the protective plates are formed of material not liable to be deformed.

The container base 1 is shaped such that it has four sides each being in the form of an arc of an imaginary circle centered on one of two lines which pass through the center of the circular opening 4 for holding the disk 2 therein and are disposed at right angles to each other and having a radius of curvature greater than that of the center opening 4 of the container base 1. Each engaging and holding member for engaging the protective plates 3a and 3b for releasably holding the disk in the disk holding space is mounted in four large-width portions formed between the outer periphery of the center opening 4 and the outer periphery of the container base 1. Thus, there is no need to substantially increase the size of the container base 1 as compared with the disk 2, for mounting thereon four engaging and holding members. Also, the four sides of the container base 1 are in the form of an arc of an imaginary circle of a greater radius of curvature than the center opening 4 of the container base 1. This avoids concentration of stresses in the smallest-width portions along the line y—y' or x—x' in FIG. 2) of the container base 1 when the disk container undergoes deformation, because a change in width is not great in the vicinity of such smallest-width portions, thereby increasing mechanical strength of the disk container.

Figure 14:
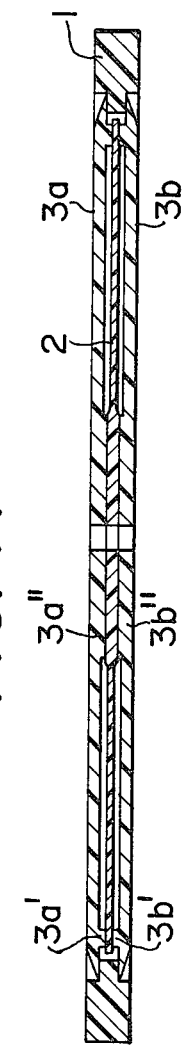
FIG. 14 is a sectional side view of the container for the recording disk wherein the protective plates are formed with projections abutting against non-recording portions of the disk to ensure that the recording surfaces of the disk are protected.

FIG. 14 shows the protective plates 3a and 3b each formed with projections 3a', 3b', 3a'', 3b'' in portions thereof where the protective plates 3a, 3b are brought into contact with non-recording portions of the disk 2 held in the container base 1, so as to protect the recording surfaces of the disk 2 positively and increase mechanical strength of the protective plates 3a and 3b.

More specifically, projections 3a', 3a'', 3b' and 3b'' are formed on the protective plates 3a and 3b in portions thereof brought into contact with the non-recording portions in the outer marginal portion of the disk 2 and/or the non-recording portion in the center (labeled portion) of the disk 2. When the disk 2 is held in the container base 1, the projections 3a', 3a'', 3b' and 3b'' are brought into contact with the disk 2 and hold the latter in place by pressing against same. By forming the protective plates 3a and 3b with rigid material, it is possible to avoid deformation of the disk 2.

When the projections 3a', 3a'', 3b' and 3b'' are in the form of an annular projection, it is possible to effectively avoid exposure of the recording surfaces of the disk 2 to dust.

Figure 15:
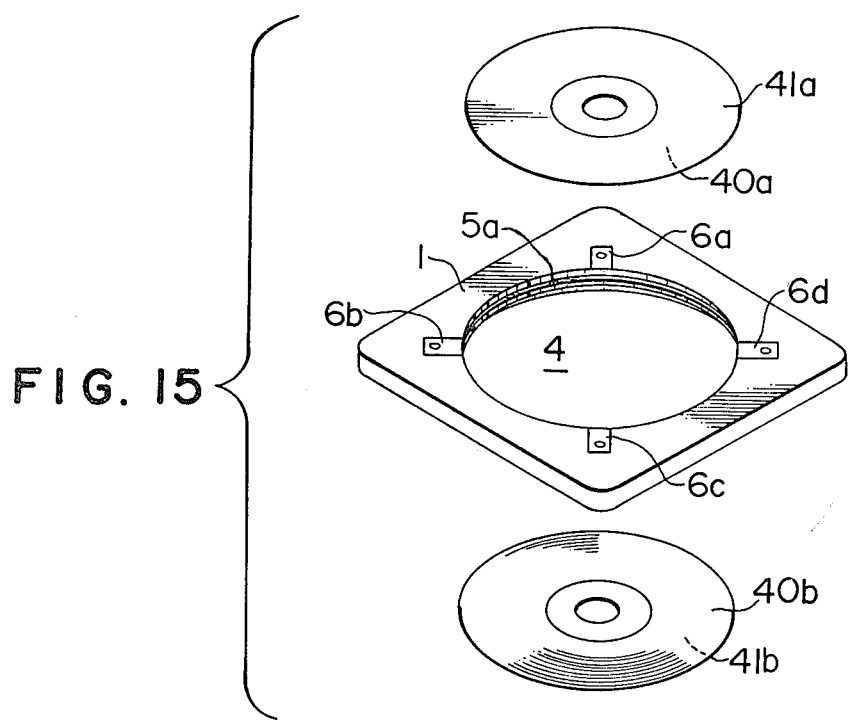
FIGS. 15, 16A and 16B show the container for the recording disk in another embodiment of the invention, FIG. 15 being an exploded perspective view of the container, FIG. 16A being a perspective view of the engaging claw and FIG. 16B being a fragmentary sectional side view of the container.
Figure 16A:
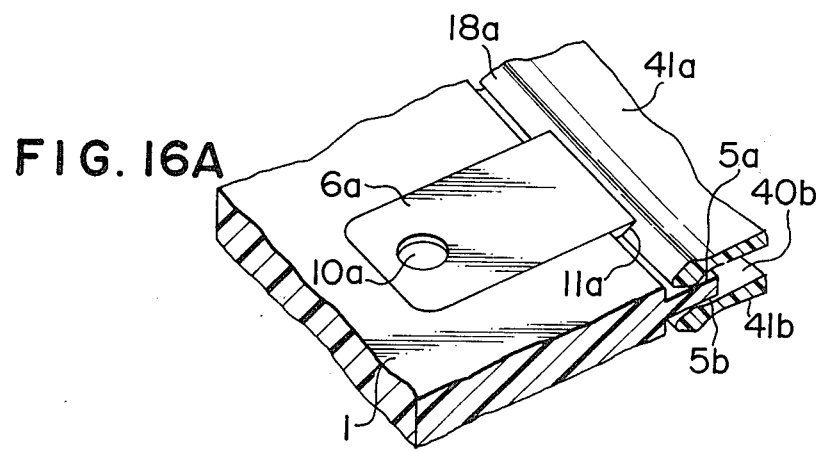
Figure 16B:
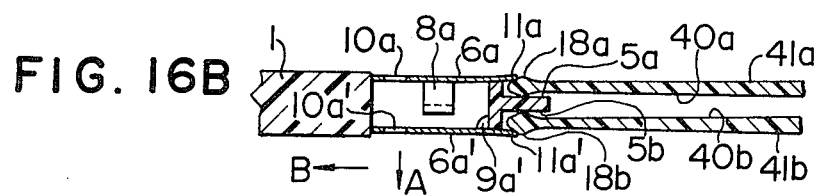

FIGS. 15, 16A and 16B show the disk container in another embodiment of the invention. The disk container shown in these figures is distinct from the disk container shown in FIG. 1 in that the former is adapted to hold in the container base 1 two disks 41a and 41b each having signal recording surface 40a or 40b on one surface alone in such a manner that the signal recording surfaces 40a and 40b face inwardly toward each other. Loading and unloading of the container base 1 with the disks 41a and 41b are carried out in the same manner as in the disk container shown in FIG. 1.

Figure 17:
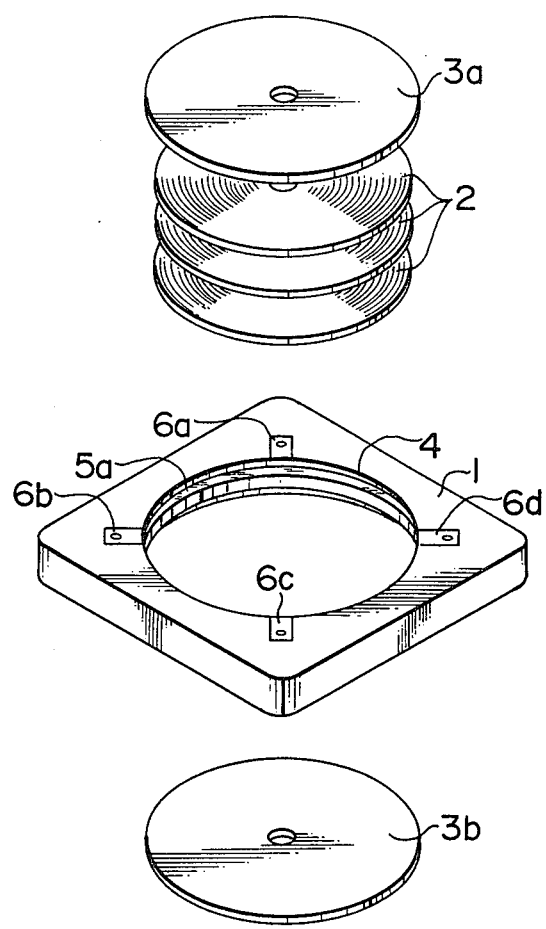
FIGS. 17, 18A and 18B show the container for the recording disk in still another embodiment of the invention, FIG. 17 being an exploded perspective view of the container, FIG. 18A being a perspective view of the engaging claw and FIG. 18B being a fragmentary sectional side view of the container.
Figure 18A:
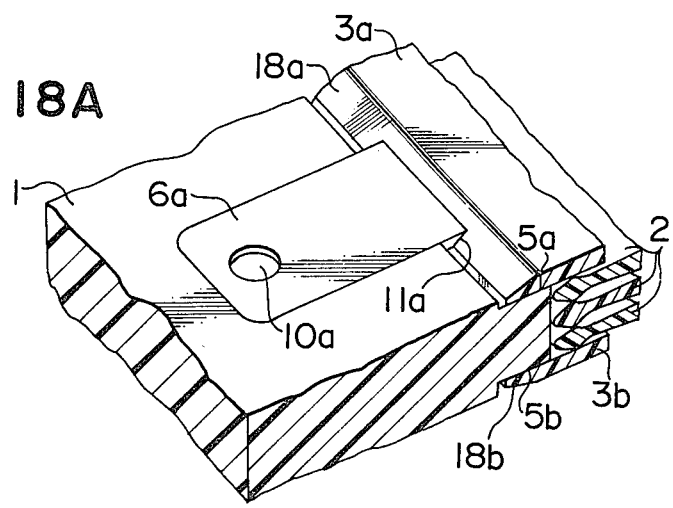
Figure 18B:
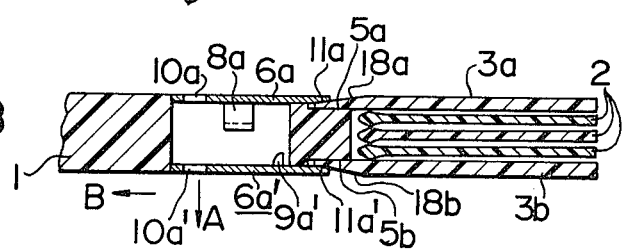

FIGS. 17, 18A and 18B show the disk container in still another embodiment of the invention. The disk container shown in these figures is adapted to hold a plurality of disks (three in the embodiment shown) having signal recording surfaces on both sides of the disks. The disk container shown in FIGS. 17, 18A and 18B is substantially similar in construction to the disk container shown in FIG. 1 except that the former holds therein a plurality of disks instead of one disk.

Figure 19:
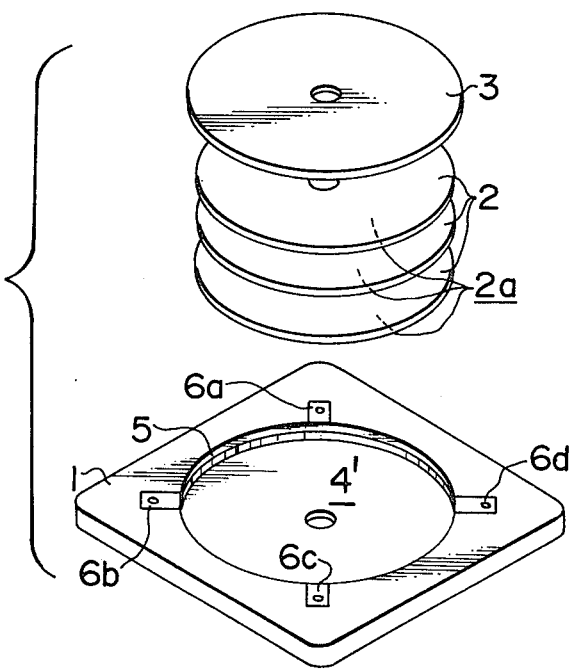
FIGS. 19, 20A and 20B show the container for the recording disk in a further embodiment of the invention, FIG. 19 being an exploded schematic view of the container, FIG. 20A being a perspective view of the engaging claw and FIG. 20B being a fragmentary sectional side view of the container.
Figure 20A:
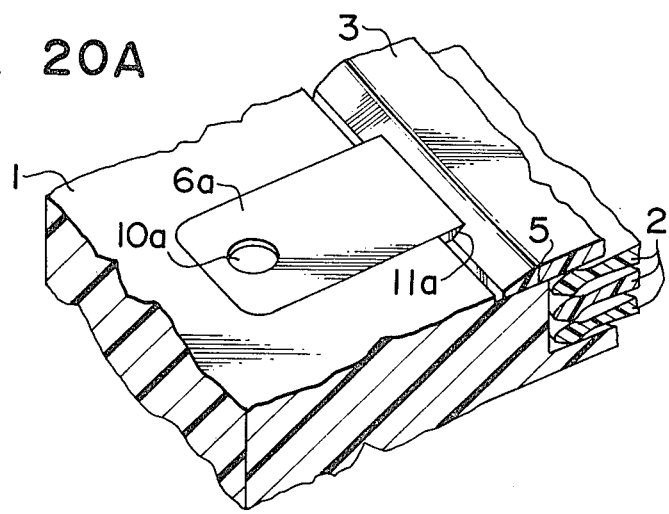
Figure 20B:
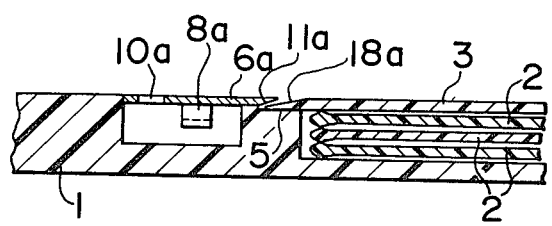

FIGS. 19, 20A and 20B show the disk container comprising a further embodiment of the invention. The container base 1 is formed with a center opening 4' in which a plurality of disks 2, each having a signal recording surface 2a on one side alone thereof, are held with the aid of only one protective plate 3. The disk container shown in these figures is similar to that shown in FIG. 1 in respect of the engaging claws 6a, 6b, 6c and 6d and 6a', 6b', 6c' and 6d' and other parts.

Figure 21:
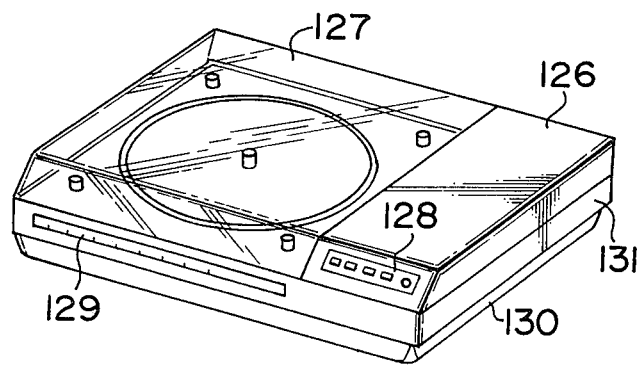
FIG. 21 is a perspective perspective view of the disk player comprising one embodiment of the invention.

Examples of disk players suitable for using the disk containers shown and described hereinabove will now be described. FIG. 21 shows a disk player in a perspective view, which comprises a case 126, a dust cover 127 connected to a chassis 131, switches 128, indicators 129 and a lower case 130.

Figure 22:
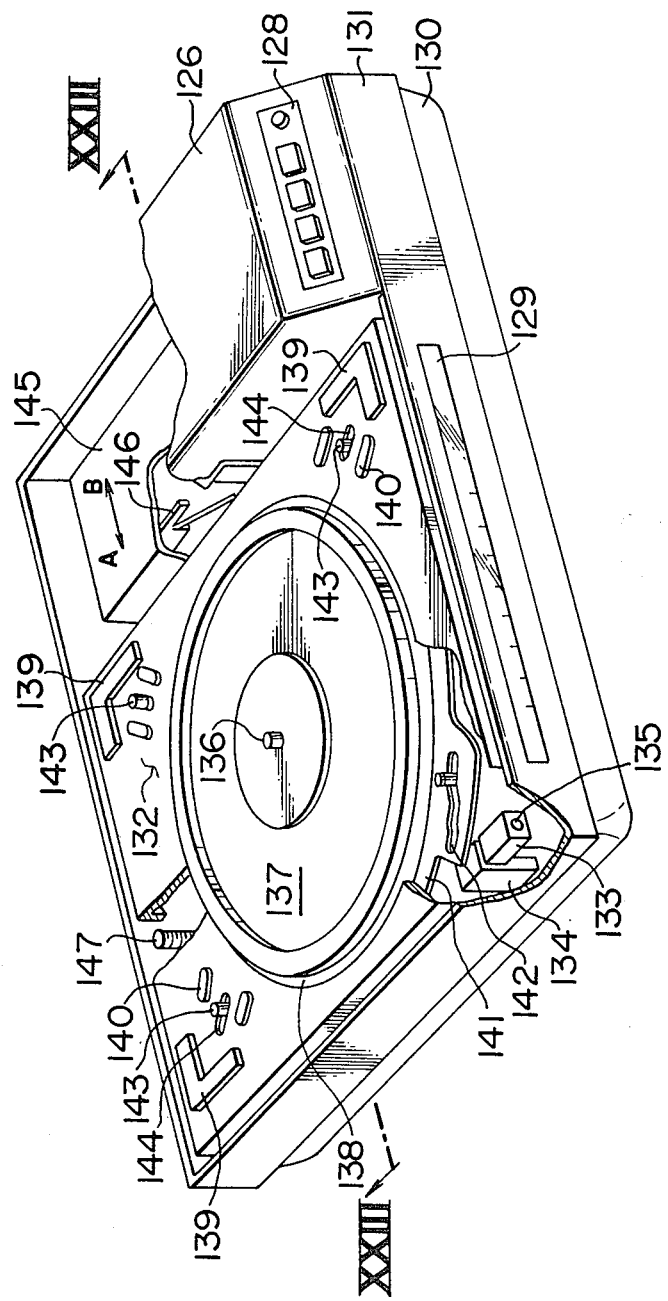
FIG. 22 is a perspective perspective view of the disk player shown in FIG. 21, as seen from another angle and shown on a larger scale with the dust cover being removed.

FIG. 22 shows the disk player of FIG. 21 with the dust cover 128 being removed. A loading base 132 is supported by bearings 133 secured to thereof and which are in turn carried through shafts 135 by fixtures 134 secured to the chassis 131 for pivotal movement about the shaft 135. The loading base 132 has in its central portion a turntable 137 formed with a center boss 136, and a circular opening 138 concentric with the turntable 137 and slightly larger in size than the protective plates 3a and 3b. The loading base 132 has in four corners thereof guide plates 139 for regulating the position of the disk container placed thereon, disk container locking members 140, and slots 144 for receiving therein release pins 143 arranged to be engaged in the release openings 10a–10d and 10a'–10d' of the engaging claws 6a–6d and 6a'–6d', respectively. The release pins 143 are each received at the other end portion thereof in one of cam slots 142 formed in a disk cam 141 rotatably supported by the loading base 132 concentrically with the turntable 137. The release pins 143 and parts associated therewith are subsequently to be described in detail. The numeral 146 designates a pickup for detecting signals recorded on the disk 2, and the numeral 145 designates a pickup carriage arranged to move in scanning movement radially of the disk 2 in the direction of arrows A and B in FIG. 22. The numeral 147 designates a vertically moving screw jack for driving the loading base 132 for pivotal movement about the shaft 135.

Figure 23:
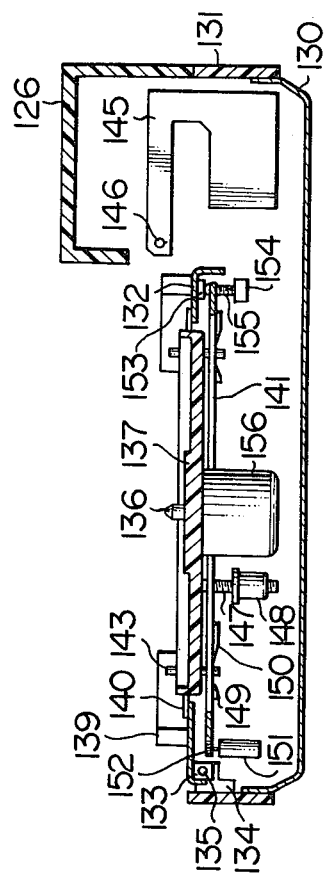
FIG. 23 is a sectional view taken along the line XXIII—XXIII in FIG. 22.

FIG. 23 shows the XXIII—XXIII section of FIG. 22 wherein the disk cam 141 carries thereon (or formed integrally therewith) vertical cams 149 and 150 for cooperation with the release pins 143. The vertical cams 149 and 150 are subsequently to be described in detail. The disk cam 141 is formed thereon with a serration, not shown, arranged to mesh with a gear 152 of a disk motor 151 for driving the disk cam 141 for rotation. A rotary nut 148 is in threadable engagement with the screw jack 147 through a recoil preventing means, not shown. Rotation of the rotary nut 148 by drive means, not shown, moves the screw jack to permit the loading base 132 to be moved vertically in pivotal movement about the shaft 135. The loading base 132 has attached at an end thereof opposite to the end supported by the shaft 135 to an abutting plate 153 against which a screw 155 supported by a holder 154 for vertical adjustments abuts at its forward end, thereby to regulate the rest position of the loading base 132 when the latter moves downwardly in pivotal movement. The numeral 156 designates a drive motor for the turntable 137.

Figure 24:
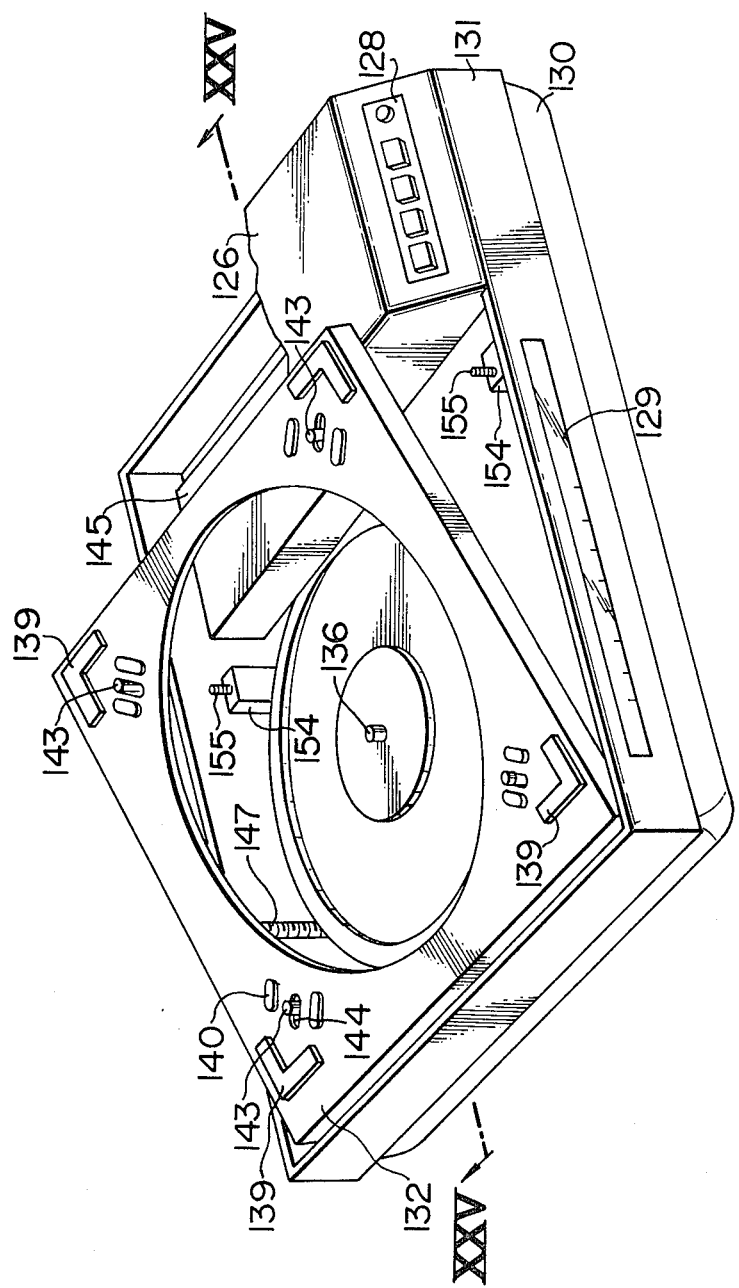
FIG. 24 is a view similar to FIG. 22 but showing the disk player with the loading base being pivotally moved to its upper position.

FIG. 24 shows the loading base 132 moved upwardly in the pivotal movement from the position shown in FIG. 22. Upward movement of the screw 147 caused by rotation of the rotary nut 148 moves the loading base 132 in the pivotal movement to a predetermined position, thereby creating a situation in which the pickup carriage 145 can move radially of the turntable 137 under the loading base 132.

Figure 25:
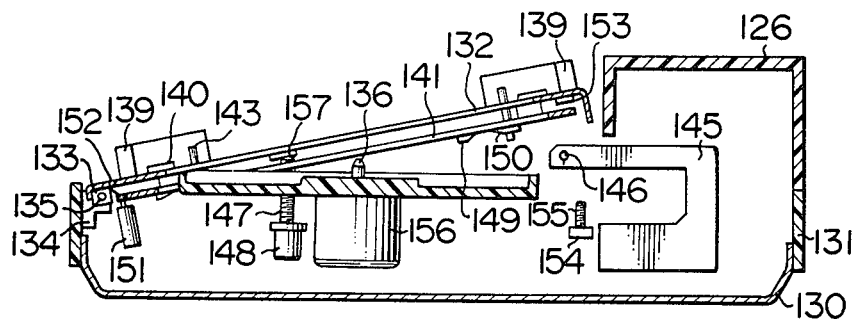
FIG. 25 is a sectional view taken along the line XXV—XXV in FIG. 24.

FIG. 25 is a sectional view taken along the line XXV—XXV in FIG. 24, in which the screw 147 has moved upwardly while its forward end is in abutting engagement with a plate 157 attached to the loading base 132, so that the loading base 132 has been swung about the shaft 135.

Figure 26A:
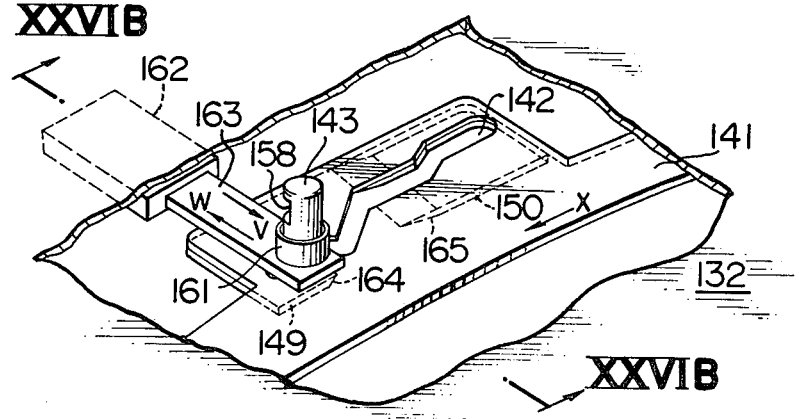
FIGS. 26A through 26E in detail the operation of the release pin and parts associated therewith, with the release pin being in a standby position, FIG. 26A being a perspective view of the release pin in the standby position, FIG. 26B being a sectional view taken along the line XXVIB—XXVIB in FIG. 26A, FIG. 26C being a plan view of essential portions of the disk cam, FIG. 26D being a side view of the essential portions of the disk cam and FIG. 26E being a perspective view of the support portion for the release pin.
Figure 26B:
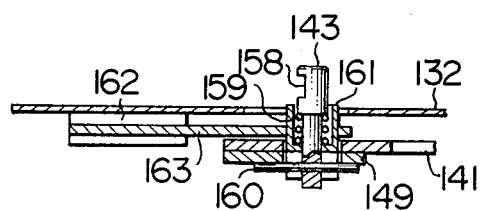
Figure 26C:
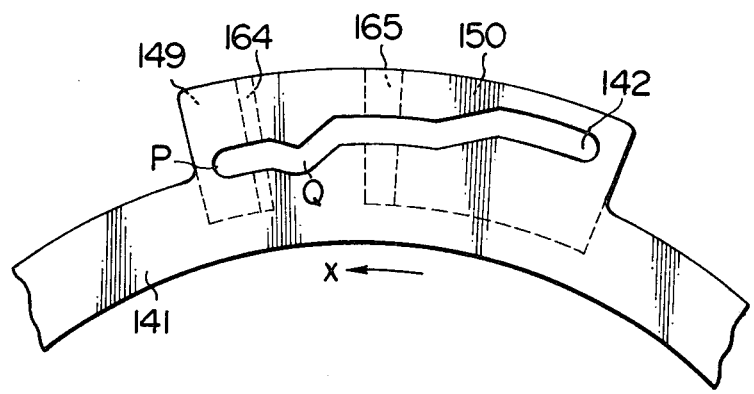
Figure 26D:
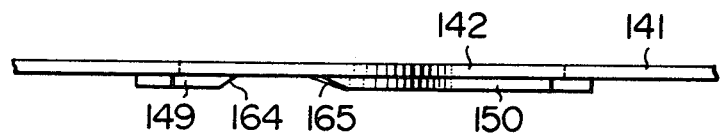
Figure 26E:
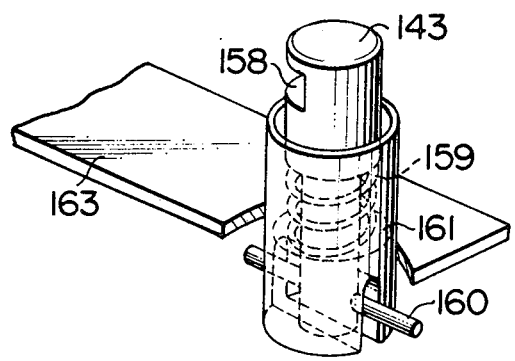
Figure 27A:
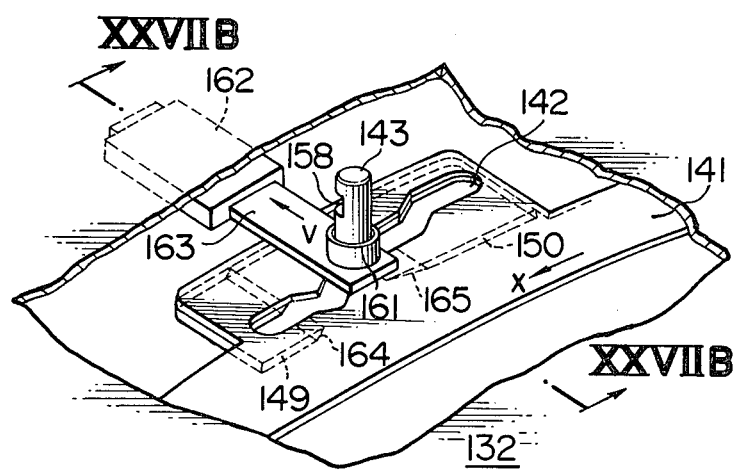
FIGS. 27A, and 27B show in detail the operation of the release pin and parts associated therewith, with the release pin being in an intermediate position, FIG. 27A being a perspective view of the release pin in the intermediate position and FIG. 27B being a sectional view taken along the line XXVIIB—XXVIIB in FIG. 27A.
Figure 27B:
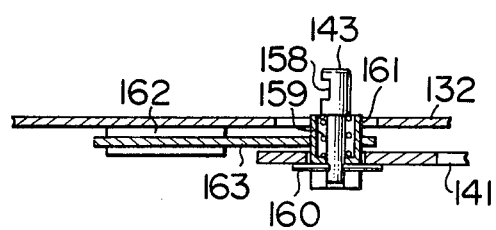
Figure 28A:
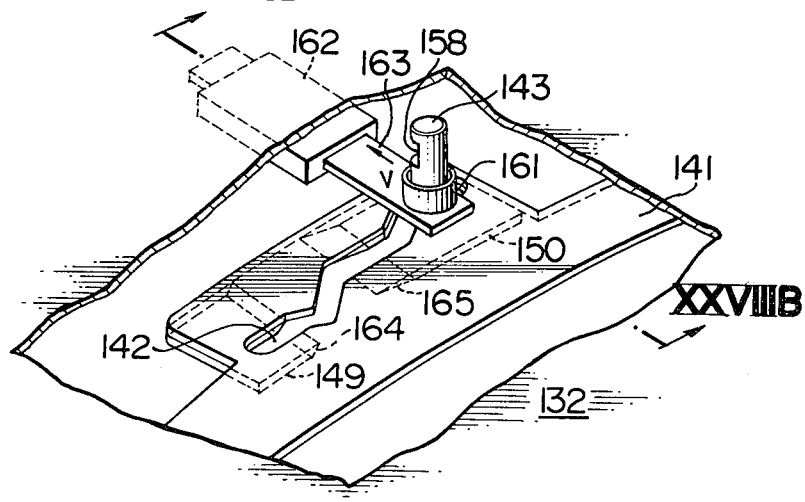
FIGS. 28A and 28B show in detail the operation of the release pin and parts associated therewith, with the release pin in a loading completion position, FIG. 28A being a perspective view of the release pin in the loading completion position and FIG. 28B being a sectional view taken along the line XXVIIIB—XXVIIIB in FIG. 28A.
Figure 28B:
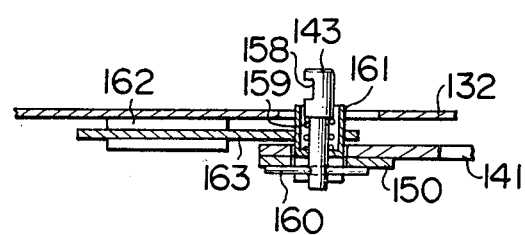

FIGS. 26A to 28B show in detail the sequential movements of the release pins 143, FIG. 26A through 26E showing the release pin 143 in a standby position, FIGS. 27A through 27B showing the release pin 143 in an intermediate position and FIGS. 28A through 28B showing the release pin 143 in a loading completion position.

FIG. 26A shows the release pin 143 in the standby position in a perspective view, FIG. 26B is a sectional view taken along the line XXVIB—XXVIB in FIG. 26A, FIG. 26C is a plan view showing the essential portions of the disk cam 141, FIG. 26D is a side view of the disk cam 141 and FIG. 26B is a perspective view of the support for the release pin 143. The release pin 143 formed with a cutout 158 in its upper portion is supported by a boss 161 for vertical sliding movement while being urged to move upwardly by a spring 159, and has a pin 160 secured to its lower portion and abutting against the disk cam 141 in a manner to function as a recoil preventing means with respect to the boss 161. By this construction, the release pin 143 can be moved vertically relative to the disk cam 141 and vertical cams 149 and 150. The boss 161 is secured to a slide plate 163 supported by a guide 162 attached to the loading base 132 for sliding movement in the directions of arrows V and W in FIG. 26A. The boss 161 is engaged at its lower portion in the cam slot 142 formed in the disk cam 141 for movement in the directions of the arrows W and V along the cam slot 142 as the disk cam 141 rotates.

FIG. 26C shows the shape of the cam slot 142 including a first section which extends from the standby position P and has a portion toward the center of the disk cam 141 in a position shifted from the vertical cam 149, a second section which extends toward the outer periphery of the disk cam 141 for a distance larger than the distance for the portion of the first section extending toward the center of the disk cam 141, the second section reaching to a portion farther away from the center of the disk cam 141 than the first section, a third section which is an arcuate section contiguous with the second section and having a center concentric with the center of rotation of the disk cam 141, a fourth section contiguous with the third section and extending farther outwardly away from the center of the disk cam 141 and a fifth section which is an arcuate section contiguous with the fourth section and having a center concentric with the center of rotation of the disk cam 141.

The vertical cams 149 and 150 are formed with inclined portions 164 and 165 in a position where the standby position P in the cam slot 142 shifts to the first section and an intermediate position in the third section, respectively, so as to permit the pin 160 to smoothly engage with the vertical cams 149 and 150 in sliding movement. In FIGS. 26A and 26B in which the release pin 143 is shown in the standby position, the pin 160 has run on the vertical cam 149, so that the release pin 143 has moved downwardly against the biasing force of the spring 159 for a distance corresponding to the thickness of the vertical cam 149. If the disk cam 141 is rotated in the direction of an arrow X by the disk cam drive motor 151 when the release pin 143 is in the aforesaid position, then the release pin 143 is moved to the intermediate position shown in FIG. 27A.

FIG. 27A shows the release pin 143 in the intermediate position in a perspective view and FIG. 27B is a sectional view taken along the line XXVIIB—XXVIIB in FIG. 27A. Rotation of the disk cam 141 from the condition shown in FIG. 26A causes the boss 161 to move along the cam slot 142, so that the slide plate 163 moves in the direction of the arrow V and the pin 160 slide down the inclined portion 164 of the vertical cam 149 into abutting engagement with the undersurface of the disk cam 141. This permits the release pin 143 to be moved upwardly by the biasing force of the spring 159 for a distance corresponding to the thickness of the vertical cam 149. Further rotation of the disk cam 141 from the condition just described in the direction of the arrow X has the release pin 143 moved to the loading completion position, shown in FIG. 28A.

FIG. 28A shows the release pin 143 in the loading completion position in a perspective view and FIG. 28B is a sectional view taken along the line XXVIIIB—XXVIIIB in FIG. 28A. Rotation of the disk cam 141 from the position shown in FIG. 27A causes the boss 161 to move along the cam slot 142, so that the slide plate 163 moves in the direction of the arrow V and the pin 160 slides on the inclined portion 165 of the vertical cam 150 into abutting engagement with the vertical cam 150. As a result, the release pin 143 moves downwardly against the biasing force of the spring 159 for a distance corresponding to the thickness of the vertical cam 150. The aforesaid interlocked events occur simultaneously with the four release pins 143.

The disk container loading operation is completed when the release pins 143 move to the loading completion position. It is to be understood that the stroke of the cam slot 142 and the thickness of the vertical cams 149 and 150 are selected such that the movement of the release pins 143 from the standby position to the loading completion position takes place in timed relation to the movement of the disk cam 141. A disk container unloading operation can be performed by reversing the operations described hereinabove with reference to the release pins 143 and parts associated therewith and shown in FIGS. 26A to 28B.

FIGS. 29A to 29F show the operation of the disk player loaded with the disk container. The operation of the disk player will be described successively by referring to the FIGS. 29A to 29F.

Figure 29A:
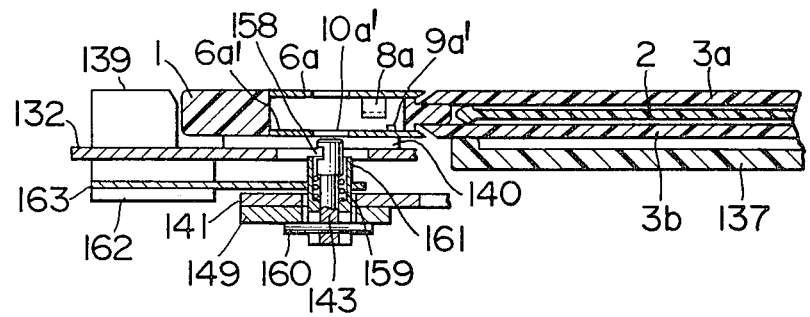
FIGS. 29A through 29F show the disk player loaded with the disk container, FIG. 29A showing the disk player loaded with the disk container and having the release pin in the standby position as shown in FIG. 26, FIG. 29B being similar to FIG. 29A but showing the slide plate moving in the direction of an arrow W in FIG. 26 as the disk cam rotates, FIG. 29C being similar to FIG. 29B but showing the slide plate moving in the direction of an arrow V in FIG. 27 as the disk cam further rotates, FIG. 29D being similar to FIG. 29C but showing the release pin moving downwardly as the disk cam further rotates, FIG. 29E being similar to FIG. 29D but showing the slide plate moving in the direction of the arrow V in FIG. 27 as the disk cam further rotates and FIG. 29F being similar to FIG. 29E but showing the disk and one of the protective plates being placed on the turntable for rotation and the pickup carriage being inserted between the loading base and the disk to permit the disk to be played.
Figure 29B:
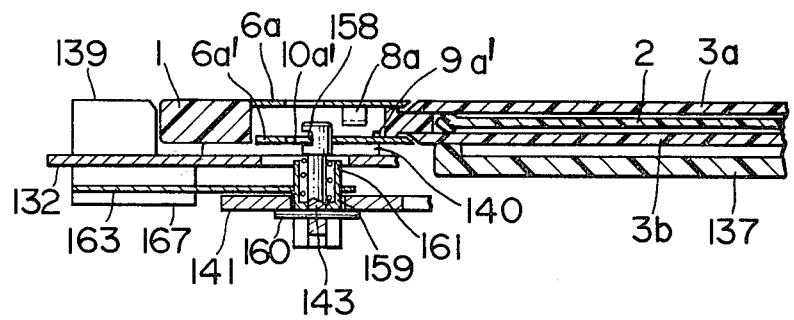
Figure 29C:
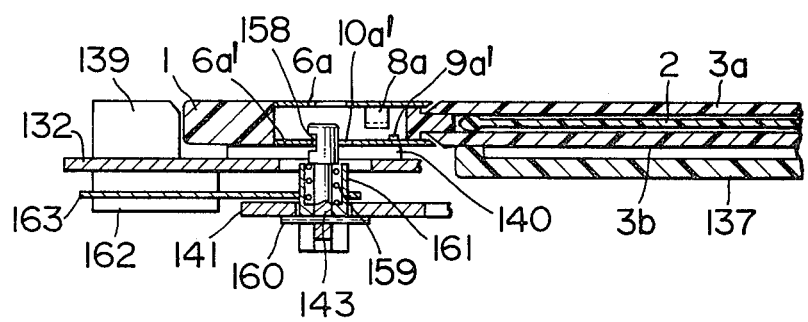
Figure 29D:
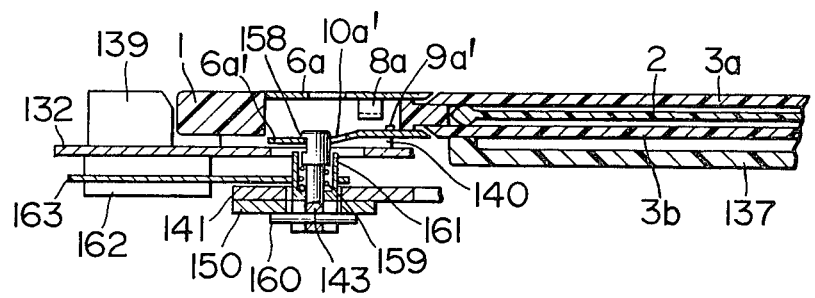

FIG. 29A shows the disk player in the standby position as shown in FIG. 26A which is loaded with the disk container shown as the first embodiment. The disk container has its position regulated as the center boss 136 of the turntable 137 engages in center openings formed in the protective plates 3a and 3b and the disk 2, and as the outer periphery of the container base 1 engages the guide plates 139. The disk container also has its position regulated vertically by the turntable 137 and the locking members 140. Thus the disk player is in a first position in which the release opening 10a' of the engaging claw 6a' is located immediately above the release pin 143. Rotation of the disk cam 141 by the disk cam drive motor 151 in the direction of the arrow X in FIG. 26 causes the pin 160 to slide up the inclined portion 164 of the vertical cam 149, so that the release pin 143 is moved upwardly by the biasing force of the spring 159 for a distance corresponding to the thickness of the vertical cam 149 and the forward end of the release pin 143 is introduced into the release opening 10a'. At the same time, the boss 161 moves along the cam slot 142 and the slide plate 163 moves in the direction of the arrow W shown in FIG. 26. Thus the release pin 143 moves to a position shown in FIG. 29B in which the release pin 143 has moved to a point Q in FIG. 26C.

Figure 29E:
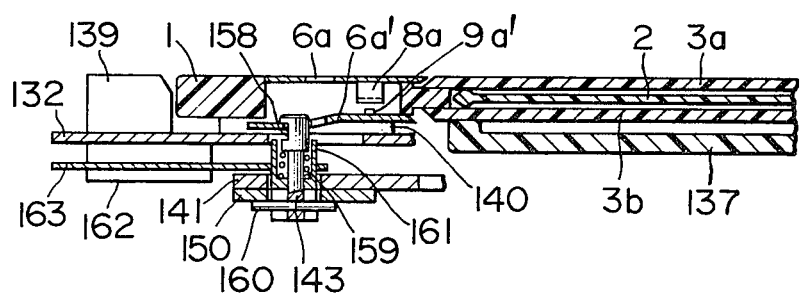
Figure 29F:
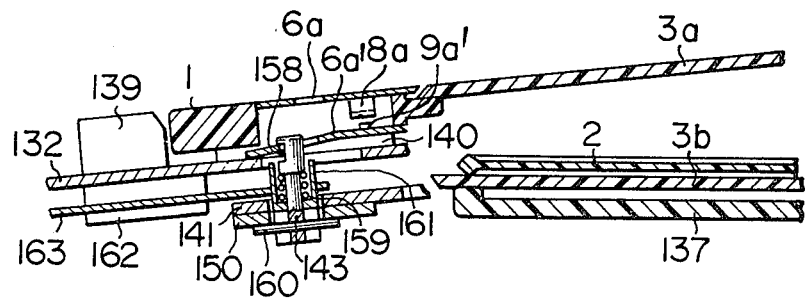

Further rotation of the disk cam 141 causes the boss 161 to move along the second section of the cam slot 142, so that the slide plate 163 moves in the direction of the arrow V shown in FIG. 27A. As a result, the cutout 158 in the release pin 143 moves to a position in which it abuts against the edge of the release opening 10a', and in which the release pin 143 is in its second position shown in FIG. 29C. During the aforementioned operation, the release pin 143 does not move, vertically. Further rotation of the disk cam 141 causes the pin 160 to run on the inclined portion 165 of the vertical cam 150, so that the release pin 143 moves downwardly against the biasing force of the spring 159 for a distance corresponding to the thickness of the vertical cam 150. This brings the upper portion of the cutout 158 into abutting engagement with the engaging claw 6a', and pulls the engaging claw 6a' downwardly by virtue of the elasticity of the latter to release the same from engagement with the end edge 16a' of the container base 1 (See FIG. 3). Thus the disk player is moved to a third position shown in FIG. 29D. The cam slot 142 is shaped such that during the aforesaid operation the slide plate 163 does not move (third section). Further rotation of the disk cam 141 causes the boss 161 to move along the fourth section of the cam slot 142, and therefore the slide plate 163 moves in the direction of the arrow V in FIG. 27, so that the guide 8a' of the engaging claw 6a' moves in sliding movement along the recessed sliding surface 12a' (See FIG. 3) and releases the protective plate 3b from engagement with the container base 1. Still further rotation of the disk cam 141 brings the boss a fourth position shown in FIG. 29E in which rotation of the disk cam 141 is interrupted. During the aforesaid operation, the release pin 143 does not move vertically. The angle of rotation of the disk cam 141 from the position shown in FIG. 29A to the position shown in FIG. 29E is regulated as by a microswitch, not shown. Interruption of the rotation of the disk cam 142 results in rotation of the rotary nut 148 which causes the vertically moving screw 147 to move upwardly, so that the loading base 132 has been swung upwardly in pivotal movement about the shaft 135 to a predetermined height while the protective plate 3a and the container base 1 are placed on the loading base 132.

Meanwhile the disk 2 and the protective plate 3b are placed on the turntable 137 and rotated by the turntable 137, so that a disk playing operation can be performed after the pickup carriage 145 is inserted between the loading base 132 and the disk 2, as shown in FIG. 25.

The series of interlocked events shown in FIGS. 29A to 29E occur simultaneously and continuously with respect to the four release pins 143 on the loading base 132 by the action of the disk cam 141. Placing of the disk 2 on the turntable 137 shown in FIG. 29F takes place continuously after the loading base 132 is moved upwardly in pivotal movement as shown in FIG. 29E.

A disk unloading operation can be performed by reversing the operations described hereinabove or by rotating the rotary nut 148 in the reverse direction to move the vertically moving screw 137 downwardly and to rotate the disk cam 141 in the reverse direction. When it is desired to play the underside of the disk 2, one has only to place the disk container on the loading base 132 in an upside-down position.

The disk loading mechanism has been shown and described hereinabove. The shape of the cam slot 142 in which the cam slot extends toward the outer periphery of the disk cam 141 after extending toward the center of the disk cam 141 performs the function of compensating for a reduction in the stroke caused by the engagement of the cutout 158 of the release pin 143 with the release opening 10a' of the engaging claw 6a', when a disk unloading operation is performed.

Figure 30:
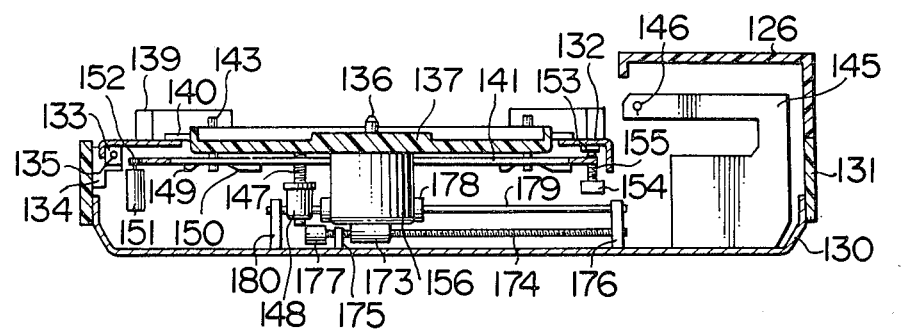
FIGS. 30 and 31 show the disk player comprising another embodiment of the invention, FIGS. 30 and 31 being sectional views corresponding to FIGS. 23 and 25 respectively showing the disk player of the first embodiment.
Figure 31:
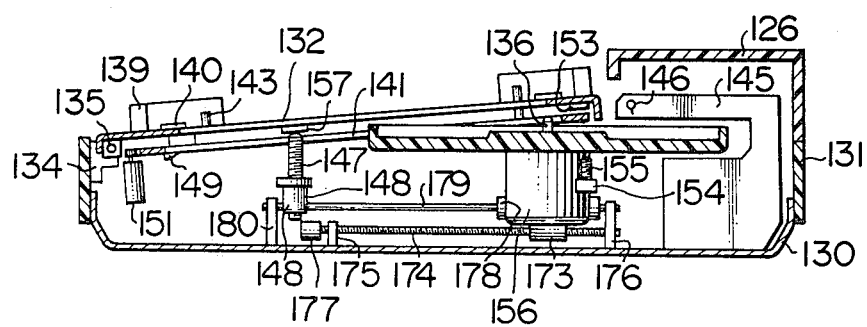

FIGS. 30 and 31 show the disk player comprising another embodiment of the invention. The disk player shown in these figures is distinct from the disk players shown in FIGS. 6 to 7B and FIGS. 21 to 25 in that the turntable moves successively with respect to the pickup carriage in the former while the pickup carriage successively moves radially of the turntable in the latter, when the disk is played.

FIGS. 30 and 31 are sectional views corresponding to FIGS. 23 and 25 respectively. The disk player shown in FIGS. 30 and 31 is distinct from the disk player shown in FIGS. 23 and 25 in that the pickup carriage 145 is stationary and the turntable 147 is movable.

More specifically, a feed nut 173 secured to the turntable drive motor 156 is in threadable engagement with a feed screw 174 rotatably supported at opposite ends thereof by bearings 175 and 176. The numeral 177 designates a motor for driving the feed screw 174, and the numeral 178 designates a guide secured to the drive motor 156 and slidably fitted over a guide rod 179 secured at opposite ends thereof to bearings 176 and 180.

FIG. 31 shows the loading base 132 in an inclined position after being swung in pivotal movement about the shaft 135 as shown in FIG. 25. Upward movement of the vertically moving screw 147 caused by rotation of the rotary nut 148 swings the loading base 132 to a predetermined upper position, so that the turntable 137 is moved radially thereof in a horizontal plane by the feed screw drive motor 177 and is possible to move into (and out of) a position below the pickup 146. FIG. 31 shows the turntable 137 disposed in a position below the pickup 146.

By stationarily fixing the pickup and moving the turntable in the portion of playing the disk, it is possible to minimize the space between the loading base and the turntable. This allows an overall compact size for a disk player.

Figure 32:
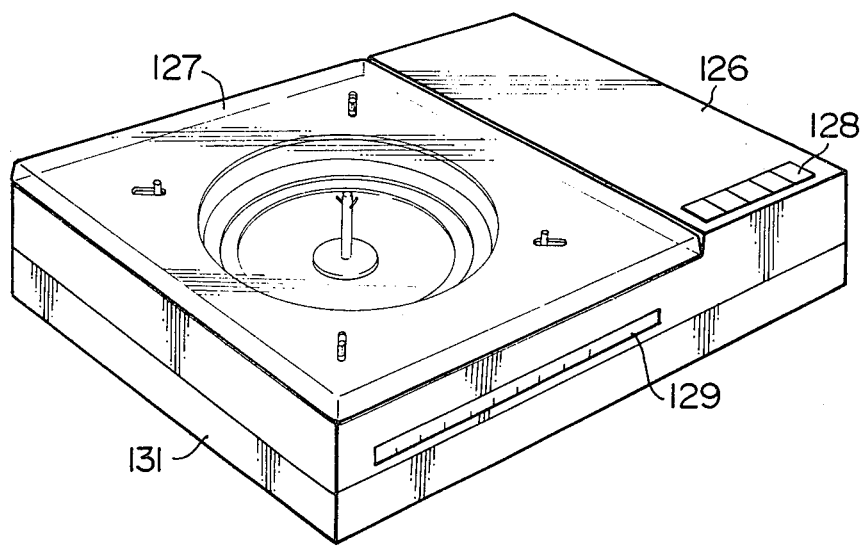
FIGS. 32 and 33 show the disk player suitable for use with the container holding therein a plurality of disks as shown in FIGS. 17 and 19.
Figure 33:
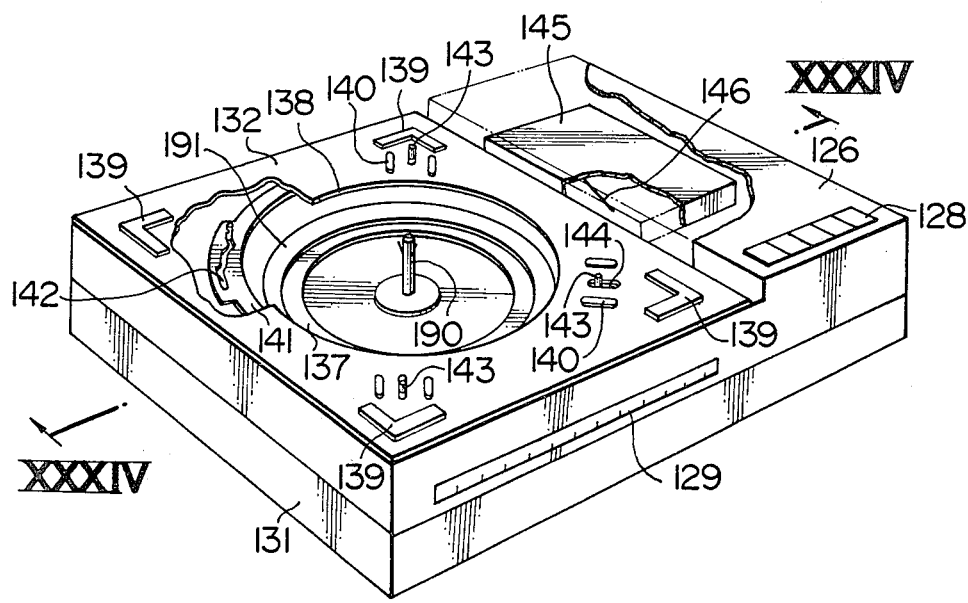

FIGS. 32 and 33 show the disk player comprising still another embodiment of the invention suitable for use with a disk container holding therein a plurality of disks as shown in FIGS. 17 to 19. Parts similar to those shown in the previous embodiment are designated by like reference characters.

FIG. 32 shows the external appearance of the disk player, and FIG. 33 shows the disk player of FIG. 32 after the dust cover 127 is removed. The turntable 137 has attached to its center an umbrella type shaft 190 which is the same as hitherto used in an autochanger type record player. The loading base 132 is secured to the chassis 131 with a predetermined space therebetween and is formed in its central portion with an opening 138 of a larger diameter than the protective plates 3a and 3b and an elevator ring 191 located around the turntable 137. The loading base 132 has located in four corners thereof guide plates 139 for regulating the position of the disk container placed on the loading base 132, disk container locking members 140, and slots 144 permitting release pins 143 to be received therein for engaging in release openings 10a–10d and 10a'–10d'' of the engaging claws 6a–6d and 6a'–6d', respectively.

The construction and operation of the release pins 143 are similar to those of the embodiment described hereinabove.

Figure 34A:
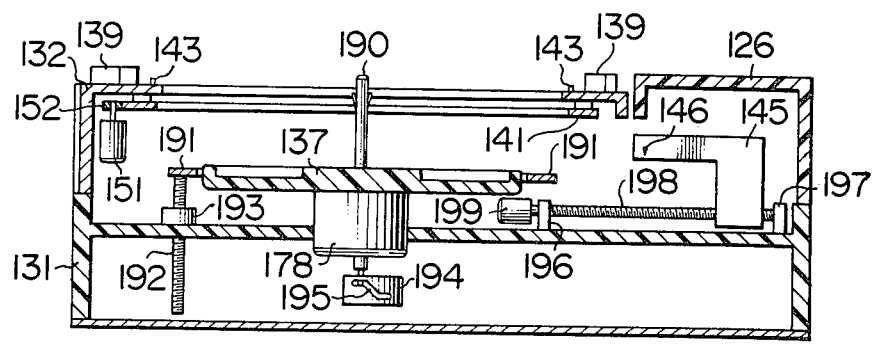
FIGS. 34A through 34C are is a sectional view taken along the line XXXIV—XXXIV in FIG. 33, FIG. 34A showing the disk player prior to loading of the container for the disks, FIG. 34B showing the disk player in playing mode, and FIG. 34C showing the disk player after completion of playing.
Figure 34B:
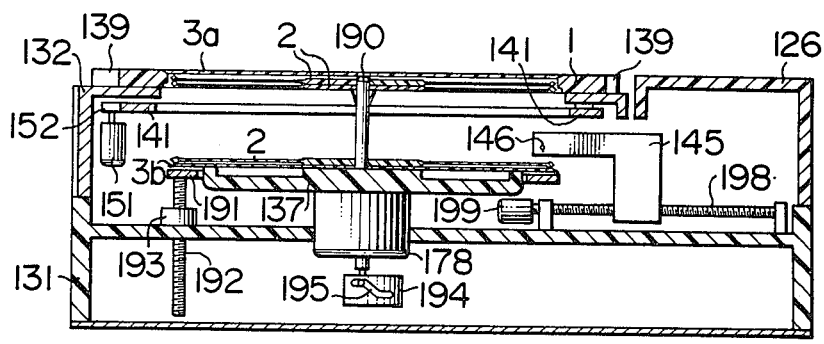
Figure 34C:
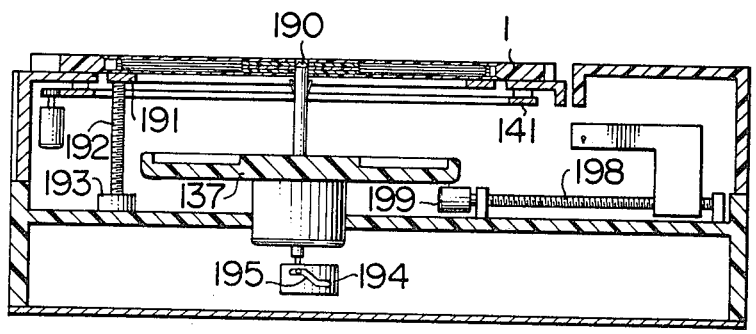

FIGS. 34A to 34C show the disk player of FIG. 33 in cross section taken along the line XXXIV—XXXIV in FIG. 33. FIG. 34A shows the disk player before being loaded with the disk container, FIG. 34B shows the disk player in playing mode, and FIG. 34C shows the disk player upon completion of playing of the disk. The disk cam 141 is rotatably supported through a support member by the loading base 132, and formed in a peripheral portion thereof with a serration, not shown, meshing with the gear 152 secured to a shaft of the disk cam drive motor 151 which drives the disk cam 141 both in the normal and reverse directions. The elevating ring 191 has secured thereto a screw jack 192 engaged through a recoil preventing member, not shown, by a rotary nut 193 supported by the chassis 131. As the rotary nut 193 is rotated, the elevating ring 191 can moved vertically. Although a drive means of the rotary nut 193 is not shown, the umbrella type shaft 190 engages at the other end thereof in a cam slot 195 of a drive cam 194, so that the disks can drop one by one in the usual manner. The pickup carriage 145 is driven by a feed motor 199 through a guide rod which is, not shown, supported to bearings 196 and 197 secured to the chassis 131 and by a feed screw 198 rotatably supported by the bearings 196 and 197, for scanning movement radially of the turntable 137.

FIGS. 35A to 35G show the interlocked events which occur when the disk player is loaded with the disk container as aforesaid. FIG. 35A shows the disk player loaded with the aforesaid disk container when the former is in the standby position shown in FIG. 34A. The disk container has its position regulated as the umbrella type shaft 190 is engaged in the center openings of the protective plates 3a 3b and the disk 2 with the outer periphery of the container base 1 engaging the guide plates 139 on the loading base 132. The disk container has its position regulated vertically by the locking members 140 on the loading base 132. In this condition, the release openings 10a' to 10d' of the engaging claws 6a' to 6d' are disposed immediately above the respective release pins 143. In this condition, the release pins 143 are in the lower position and do not interfere with loading and unloading of the disk player together with the disk container.

Rotation of the disk cam 141 causes the release pins 143 to operate as described hereinabove. The disk player passes through the positions shown in FIGS. 35B, 35C and 35D to the position shown in FIG. 35E in which the engaging claws 6a' to 6d' are released from engagement with the protective plates 3b to secure the latter to the container base 1, thereby allowing the protective plate 3b the three disks 2 to be fitted over the umbrella type shaft 190.

The umbrella type shaft 190 in the condition shown in FIG. 35E is driven in the same manner as in the case of an auto-changer type audio discplayer, to drop the protective plate 3b and the first disk 2 onto the turntable 137 as shown in FIG. 35F in which the player is ready for performance. Then the turntable 137 is driven by the turntable drive motor 178 and at the same time the pickup carriage 145 is driven by the feed motor 159 as shown in FIG. 34 to move radially of the disk 2 to play the disk 2. This condition is shown in FIG. 34B. Upon completion of playing of the first disk 2, the pickup carriage 145 is restored to its original position shown in FIG. 34A and the umbrella type shaft 190 is actuated again to drop the second disk 2 onto the turntable 137. This cycle is repeated and after completion of playing of the third disk 2, the pickup carriage 145 is restored to its original position and the rotary nut 193 shown in FIG. 34 is rotated and the elevating ring 191 moves upwardly with three disks 2 placed thereon through the protective plate 3b, to a position shown in FIG. 34C. Then, the disk cam 141 is driven by the disk cam drive motor 151 to rotate in the reverse direction to reversely perform the series of operations described hereinabove to effect unloading. The aforesaid series of operations described by referring to FIGS. 35A to 35E are simultaneously performed with four release pins 143 arranged on the loading base 132, and the operations shown in FIGS. 35E to 35G and the unloading operation are performed continuously thereafter. When it is desired to play the undersurface of the disk 2, one has only to place the disk container on the loading base 132 in an upside-down position, before the aforesaid series of operations are performed.

Figure 36:
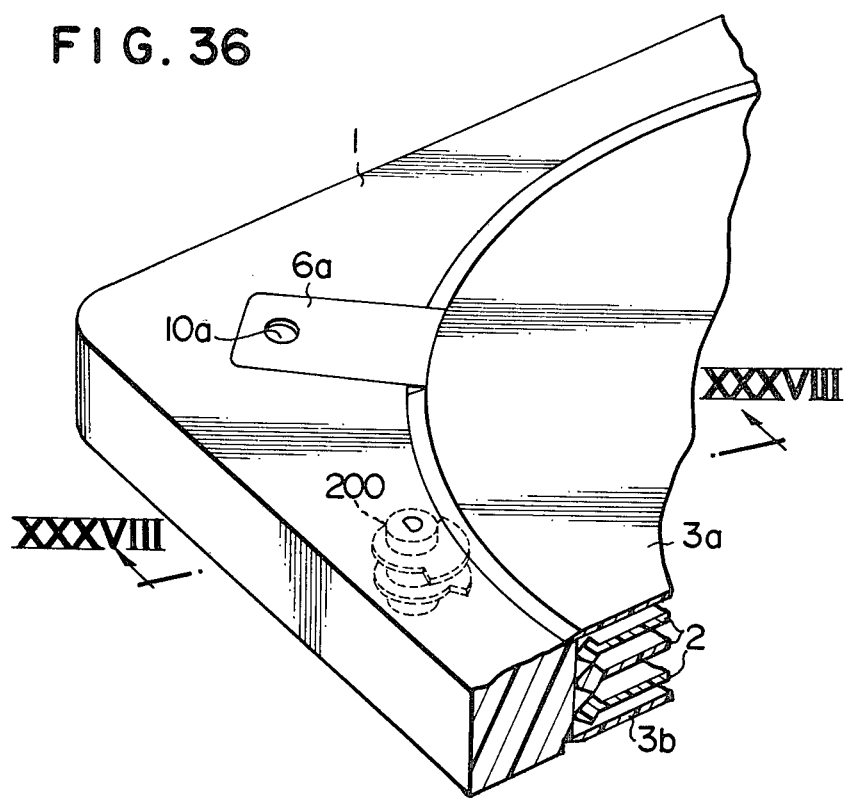
FIG. 36 is a fragmentary perspective view of essential portions of the container for the recording disks provided with means for successively placing one disk after another on the turntable of a disk player.
Figure 37:
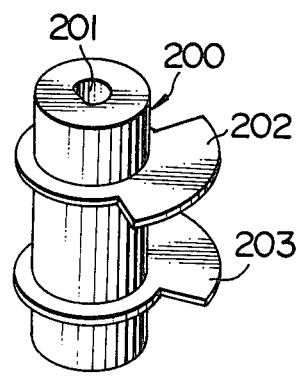
FIG. 37 is a perspective view of the selecting claw.
Figure 38A:
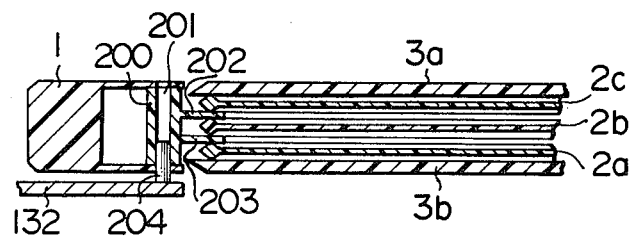
FIGS. 38A through 38D show a disk player loaded with the container for the recording disks shown in FIG. 36, FIGS. 38A to 38D showing the interlocked events occurring in sequence when the player is loaded with the container until all the disks in the container are played.
Figure 38B:
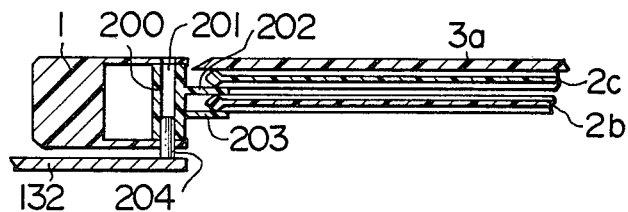
Figure 38C:
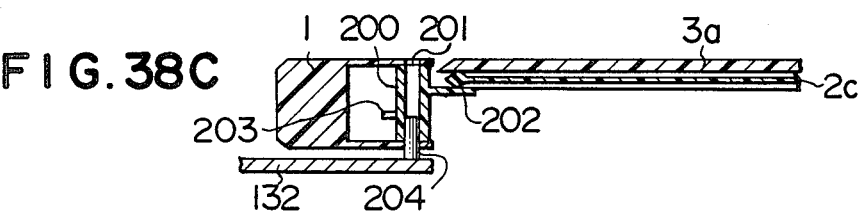
Figure 38D:
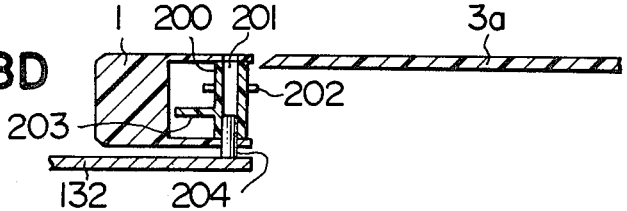

FIGS. 36 to 38D show the disk player comprising a further embodiment of the invention, which is provided with means located on the disk container for successively placing a plurality of disks one after another on the turntable. FIG. 36 is a perspective view of the disk container, showing its essential portions, wherein selection claws 200 which are rotatably supported by the container base 1 for supporting the disks 2a to 2c are each located in one corner, for example, in addition to the engaging claws 6a to 6d. FIG. 37 is a perspective view of the selection claw 200 formed with a semicircular center axial bore 201 and including projections 202 and 203 extending perpendicular to the center axis of the claw 200, which projections are arranged around the center axis at different pheripheral angles and having a spacing interval large enough to hold one of the disks 2 therebetween. FIGS. 38A to 38D show a series of interlocked events occuring when the disk container shown in FIG. 36 is placed in the disk player. The loading base 132 of the disk player has rotary pins 204 attached thereto for engagement in the semicircular bores 201 of the selection claws 200. The disk container is placed on the player in the condition as shown in FIG. 34A, wherein the release pin 143 described hereinabove is located in a position engageable in the release opening 10a' and the rotary pin 204 is engaged in the semicircular bore 201 of the selection claw 200 as shown in FIG. 38A. The player shown in FIG. 38A successively shifts positions shown in FIGS. 38B to 38D, as is the case with the embodiment described hereinabove. That is, the engaging claws 6a' to 6d' are released from engagement with the protective plate 3b, and the protective plate 3b and the first disk 2a drop onto the turntable 137 and are placed thereon as shown in FIG. 38B. In this condition, the second and third disks 2b and 2c are held by the projections 202 and 203 of the selection claws 200, respectively. Upon completion of playing of the first disk 2a, the rotary pin 204 rotates to rotate the selection claw 200 through a predetermined angle (the drive means not shown), to release the second disk 2b from engagement with the projection 203 and allow the second disk 2b to drop onto the turntable 137 as shown in FIG. 38C. In this condition, the third disk 2c is held by the projection 202 which is arranged in a peripheral angle different from that of the projection 203. Upon completion of the playing of the second disk 2b, the rotary pin 204 further rotates to cause the selection claw 200 to rotate through a predetermined angle to release the third disk 2c from engagement with the projection 202, so that the third disk 2c drops and is placed on the turntable 137 as shown in FIG. 38D. Upon completion of playing of the third disk 2c, the elevating ring 191 moved upwardly as shown in FIG. 35G and the rotary pin 204 is rotated in the reverse direction to allow the projections 203 and 202 to be inserted between the disks 2a and 2b, and 2b and 2c, respectively. Thereafter the selection claws 200 are rotated and the projections 203 and 202 are introduced between the disks 2a and 2b, and 2b and 2c, respectively, and the disk cam 141 is rotated in the reverse direction as described with reference to the previous embodiment, thereby to finish unloading.

In this embodiment, the umbrella type shaft 190 is not required and an ordinary shaft may be used instead thereof. The selection claws 200 are preferably located in positions in which they can engage the rotary pins 204 even if the disk container is placed in the disk player in the upside-down position (to play the undersurface of the disk)

Preferred embodiments of the invention have been shown and described. The umbrella type shaft can be made stationary or movable as desired by changing its construction. The umbrella type shaft may be constructed in such a manner that the portion thereof engaging the disk placed on the turntable has dual function and can be rotated. The disks held in the disk container have been described as three in number, but the invention is not limited to this specific number of disks, and the desired number of disks may be selected in the invention.

The protective plates 3a and 3b may be used as disks by utilizing their surfaces which faces inwardly toward each other when held in the disk container, as signal recording surfaces.

What is claimed is:

1. A container for a recording disk having at least on one surface thereof a signal recording surface on which signals are recorded, said container comprising:

a container base made of rigid material, including a circular opening at least on one surface thereof and having a diameter greater than the diameter of the recording disk, a surrounding portion around said circular opening, a plurality of guide grooves each having one end opened to said circular opening and the other end terminated in said surrounding portion, and at least one disk holding space in the interior thereof and communicating with said circular opening; and a plurality of engaging and holding members made of flexible material, each having a forward end portion and a rear end portion, and being disposed in said each guide groove so as to be selectively movable between a first position in which said forward end portion projects into the circular opening to lock the recording disk in said disk holding space and a second position in which said forward end portion withdraws to release the recording disk from the disk holding space through the circular opening, thereby said engaging and holding member being arranged to be bent in said rear end portion in the vicinity of the other end of said guide groove when moved from said first position to said second position so that the engaging and holding member is partly withdrawn from the guide grooves in moving in sliding motion.

2. A container as set forth in claim 1, further comprising at least one protective disk larger in diameter than said recording disk and having at least on one surface thereof a non-recording surface on which no signals are recorded, said at least one protective disk being arranged in said circular opening with said non-recording surface facing outwardly and said engaging and holding members engaging at their forward ends the outer marginal portion of said non-recording surface of said at least one protective disk when said engaging and holding members are in their first position, to thereby prevent the protective disk from being dislodged from said disk holding space through said circular opening.

3. A container as set forth in claim 2, wherein said circular opening is provided with an offset portion and said protective disk has a marginal portion abutting against said offset portion.

4. A container as set forth in claim 2, wherein said at least one protective disk is formed thereon with at least one projection for abutting against a non-signal recording portion of said recording disk held in said disk holding space.

5. A container as set forth in claim 1, further comprising a second circular opening, said openings are formed in the surface and in the undersurface, respectively, of said container base to communicate with said disk holding space so that the recording disk held in said disk holding space can be moved into and out of said holding space through one of said two circular openings.

6. A container as set forth in claim 1, further comprising a second circular opening, said circular openings are formed in the surface and in the undersurface, respectively, of said container base, said disk holding space and a second disk holding space are formed continuous with said circular openings in the surface and in the undersurface, respectively, of the container base, and the recording disks having a signal recording surface on one surface thereof alone are held in the respective disk holding spaces in such a manner that the signal recording surface of the recording disks face inwardly toward each other.

7. A container as set forth in claim 1, wherein a plurality of recording disks are held in said disk holding space of said container base.

8. A container as set forth in claim 7, further comprising engaging projections located on said container base each selectively brought into and out of engagement with one of said plurality of recording disks held in said disk holding space.

9. A container as set forth in claim 1, wherein said circular opening is formed on one surface of said container base.

10. A container for a recording disk having on at lease one surface thereof a signal recording surface, comprising:
  a container base formed of rigid material, including a circular opening at least on one surface thereof and having a diameter greater than the diameter of the recording disk, and a disk holding space in the interior thereof and communicating with said circular opening, said container base having four sides in the form of arcs of imaginary circles each centered on lines passing through the center of said circular opening and perpendicular to each other, each of said arcs of said imaginary circles having a radius of curvature greater than that of said circular opening, and
  a plurality of engaging and holding members arranged on the surface of said container base around said circular opening, and movable between a first position in which their forward end portions project into the circular opening so as to lock the recording disk in said disk holding space and a second position in which their forward end portions withdraw so as to release the recording disk from the disk holding space, said engaging and holding members being each located in one of four larger-width portions of the container base interposed between the outer edge of said circular opening and the outer periphery of said container base.

11. A recording disk playing system wherein at least one recording disk is loaded together with a container for the recording disk, said container including a container base having a circular opening at least on one surface thereof in a size of a diameter greater than the diameter of the recording disk, and a disk holding space in the interior of said container base and communicating with said circular opening, and a plurality of engaging and holding members arranged on the surface of said container base around said circular opening, and movable between a first position in which forward end portions thereof project into the circular opening so as to lock the recording disk in said disk holding space and a second position in which their forward end portions withdraw so as to release the recording disk from the disk holding space; said system comprising:
  a loading base having the container for the recording disk placed thereon with the position of said container on the loading base being regulated;
  release means operative to engage said engaging and holding members of said container when the latter is placed on the loading base so as to release said engaging and holding members from holding engagement with said recording disk;
  signal reproducing means for playing the recording disk released from said container and placed on a turntable; and
  first drive means for moving at least one of said recording disk on said turntable and said container on said loading base relative to each other to return said recording disk on said turntable to said container.

12. A system as set forth in claim 11, wherein said first drive means is operative to move said loading base toward and away from said turntable.

13. A system as set forth in claim 12, wherein said loading base is pivotally supported at one end thereof by a main body of the system, and said loading base is driven by said first drive means to move in pivotal movement in such a manner that the other end thereof at which said signal reproducing means is located is lifted away from the surface of the turntable.

14. A system as set forth in claim 12, further comprising second drive means for driving said turntable to move toward and away from said signal reproducing means to successively vary the relative positions of said recording disk on said turntable and said signal reproducing means radially of said recording disk.

15. A system as set forth in claim 11, wherein said container for the recording disk holds therein a plurality of recording disks, and further comprising recording disk loading means for successively guiding and placing on said turntable said plurality of recording disks released from said container for the recording disks by the operation of said release means.

16. A container for a plurality of recording disks each having at least on one surface thereof a signal recording surface, said container comprising:
  a container base of rigid material, including a circular opening at least on one surface thereof and having a diameter greater than the diameter of the recording disks, and a disk holding space in the interior thereof and communicating with said circular opening;
  a plurality of engaging and holding members arranged on the surface of said container base around said circular opening, and movable between a first position in which forward end portions thereof project into the circular opening so as to lock the recording disks in said disk holding space and a second position in which their forward end portions withdraw so as to release the recording disks from the disk holding space; and
  engaging projections located in said container base each selectively brought into and out of engagement with one of said plurality of recording disks held in said disk holding space.

* * * * *